(12) United States Patent
Sheenan et al.

(10) Patent No.: US 9,124,915 B2
(45) Date of Patent: *Sep. 1, 2015

(54) NATIONAL INSERTION OF TARGETED ADVERTISEMENT

(71) Applicant: INVIDI Technologies Corporation, Princeton, NJ (US)

(72) Inventors: Patrick Sheenan, Jamison, PA (US); Michael Cristofalo, Doylestown, PA (US); Bruce J. Anderson, Chesterfield, NJ (US); Daniel C. Wilson, Edmonton (CA)

(73) Assignee: INVIDI TECHNOLOGIES CORPORATION, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/226,699

(22) Filed: Mar. 26, 2014

(65) Prior Publication Data

US 2015/0067720 A1 Mar. 5, 2015

Related U.S. Application Data

(63) Continuation of application No. 12/536,347, filed on Aug. 5, 2009, now Pat. No. 8,776,115.

(60) Provisional application No. 61/086,409, filed on Aug. 5, 2008.

(51) Int. Cl.
| | |
|---|---|
| *H04N 7/10* | (2006.01) |
| *H04N 7/025* | (2006.01) |
| *H04N 21/2668* | (2011.01) |
| *H04H 20/10* | (2008.01) |
| *H04H 60/06* | (2008.01) |
| *H04N 21/81* | (2011.01) |
| *H04N 21/2347* | (2011.01) |
| *H04N 21/254* | (2011.01) |
| *H04N 21/258* | (2011.01) |
| *H04N 7/088* | (2006.01) |

(52) U.S. Cl.
CPC ......... *H04N 21/2668* (2013.01); *H04H 20/103* (2013.01); *H04H 60/06* (2013.01); *H04N 21/2347* (2013.01); *H04N 21/2541* (2013.01); *H04N 21/25883* (2013.01); *H04N 21/812* (2013.01); *H04N 7/088* (2013.01)

(58) Field of Classification Search
USPC .................................................. 725/32–36
See application file for complete search history.

(56) References Cited

U.S. PATENT DOCUMENTS

| | | | | |
|---|---|---|---|---|
| 5,424,770 | A * | 6/1995 | Schmelzer et al. | 725/36 |
| 6,002,393 | A * | 12/1999 | Hite et al. | 715/719 |
| 6,487,721 | B1 * | 11/2002 | Safadi | 725/36 |
| 7,530,086 | B2 * | 5/2009 | Brassil | 725/32 |
| 7,620,390 | B2 * | 11/2009 | Vezza et al. | 455/414.1 |
| 8,170,913 | B1 * | 5/2012 | Baluja | 705/14.43 |

(Continued)

*Primary Examiner* — Mushfikh Alam

(74) *Attorney, Agent, or Firm* — Marsh Fischmann & Breyfogle LLP; Kent A. Fischmann

(57) ABSTRACT

Systems and methods are disclosed that allow for providing targeted asset/advertisements for broadcast-wide programming feeds. The systems and methods allow network platforms to select among asset options provided with a content stream and/or replace assets in the content stream. In one arrangement, after selecting an asset, the asset is inserted into the content stream and the content stream is disseminated to subsequent network platforms (e.g., local platforms). At this time, the local platforms may insert local assets into the content stream in predetermined local asset insertion spots.

18 Claims, 12 Drawing Sheets

(56) References Cited

U.S. PATENT DOCUMENTS

| | | | |
|---|---|---|---|
| 8,205,226 B2* | 6/2012 | Ko et al. | 725/34 |
| 8,516,529 B2* | 8/2013 | Lajoie et al. | 725/87 |
| 8,522,275 B2* | 8/2013 | Heilbron et al. | 725/36 |
| 2002/0133816 A1* | 9/2002 | Greene et al. | 725/13 |
| 2003/0018966 A1* | 1/2003 | Cook et al. | 725/2 |
| 2007/0055984 A1* | 3/2007 | Schiller et al. | 725/32 |
| 2008/0040743 A1* | 2/2008 | Dharmaji | 725/35 |
| 2008/0127250 A1* | 5/2008 | DaCosta | 725/34 |
| 2009/0150926 A1* | 6/2009 | Schlack | 725/34 |
| 2009/0187939 A1* | 7/2009 | Lajoie | 725/34 |
| 2009/0248901 A1* | 10/2009 | Medin, Jr. | 709/249 |
| 2012/0124621 A1* | 5/2012 | Wendling | 725/34 |

* cited by examiner

US 9,124,915 B2

NATIONAL INSERTION OF TARGETED ADVERTISEMENT

CROSS-REFERENCE TO RELATED APPLICATION

This application claims priority to and is a continuation of U.S. patent application Ser. No. 12/536,347, entitled, "NATIONAL INSERTION OF TARGETED ADVERTISEMENT," filed on Aug. 8, 2009, which in turn claims the benefit of U.S. Provisional Application No. 61/086,409, entitled, "NATIONAL INSERTION OF TARGETED ADVERTISEMENT," filed on Aug. 5, 2008. The contents of all of the above-noted applications are incorporated herein by reference as if set forth in full and priority to these applications is claimed to the full extent allowable under U.S. law and regulations.

FIELD

Systems and methods presented herein relate to the provision of targeted assets via a network interface. In one specific arrangement, nationally targeted advertising media is provided to users of a broadcast network, wherein the content of the targeted media may be altered on a regional and/or demographic basis.

BACKGROUND

Broadcast network content or programming is commonly provided in conjunction with associated informational content or assets. These assets include advertisements, associated programming, public-service announcements, ad tags, trailers, weather or emergency notifications and a variety of other content, including paid and unpaid content. In this regard, assets providers (e.g., advertisers) who wish to convey information (e.g., advertisements) regarding services and/or products to users of the broadcast network often pay for the right to insert their information into programming of the broadcast network. For instance, advertisers may provide ad content to a network operator such that the ad content may be interleaved with broadcast network programming during one or more programming breaks. The delivery of such paid assets often subsidizes or covers the costs of the programming provided by the broadcast network. This may reduce or eliminate costs borne by the users of the broadcast network programming.

In order to achieve a better return on their investment, asset providers often try to target their assets to a selected audience that is believed to be interested in the goods or services of the asset provider. The case of advertisers on a cable television network is illustrative. For instance, an advertiser or a cable television network may target its ads to certain demographic groups based on, for example, geographic location, gender, age, income etc. Accordingly, once an advertiser has created an ad that is targeted to a desired group of viewers (e.g., targeted group) the advertiser may attempt to procure insertion times in the network programming when the targeted group is expected to be among the audience of the network programming.

Historically, broadcast content (e.g., programming) is provided from a content provider (e.g., ABC, PBS, BBC, etc.) to one or more network platforms (e.g., regional head end and/or local head ends and/or repeater stations). These network platforms receive the content and disseminate that content to network users. In this regard, the broadcast content is sometimes termed a "national feed." Typically, this national feed includes programming and interleaved advertisements. In this regard, national level advertisers who wish to disseminate their assets network-wide may pay to have their advertisements interleaved with the programming of the national feed. Accordingly, when the network platforms disseminate the broadcast content received via the national feed, the interleaved assets/advertisements are disseminated therewith. That is, interleaving of assets/advertisements with the national feed typically results in a single asset/advertisement being disseminated over the entire broadcast network.

In some broadcast networks (e.g., such as those in the United States), one or more cues may also be incorporated into the national feed. Such cues have allowed network platforms (e.g., local head ends) to identify upcoming breaks in the programming contained in the national feed. Accordingly, such local head ends may replace content within the national feed with an asset that is better suited for a local audience. Typically, in the United States, two to three minutes of every half-hour are set aside for local advertisements. However, other broadcast networks, including many foreign networks, do not provide local insertion opportunities. In this regard, all advertising in such networks is network-wide.

SUMMARY

In view of the above, the inventors of the current systems and methods (i.e., utilities) have recognized that, while network-wide (e.g., national) dissemination of assets/advertisements often provides an effective model for providing assets to consumers, in many instances such network-wide dissemination of an asset fails to provide a desired targeting granularity for asset providers. That is, in some instances, national-level asset providers having varied product lines (e.g., auto manufactures) may desire to target different assets/advertisements to different/limited geographic regions and/or to different/limited demographic groups. However, such national-level asset providers may not want to utilize local ad insertion as such local asset insertion may require interfacing with numerous (e.g., hundreds) of local network platforms. Further, local asset insertion may not provide desired insertion times and/or may not be available (e.g., foreign markets). Accordingly, the inventors have recognized the desirability of being able to provide targeted asset/advertisement dissemination for broadcast-wide programming feeds. That is, the inventors of the current utilities have recognized that national asset providers may more effectively match their assets to targeted network users if the asset providers can vary the assets provided to network users based on region and/or demographics of the network users. Accordingly, systems and methods are provided herein for providing targeted asset insertion with respect to network-wide insertion opportunities in a broadcast network.

According to a first aspect of the present invention, a system and method (hereinafter, "utility") for use in connection with delivering content to users of a broadcast network is provided. More specifically, a utility is provided wherein a content stream (e.g., national feed) of a content provider is generated for delivery to a plurality of first level network platforms (e.g., affiliates, MSOs, etc.) of a broadcast network. The content stream includes first and second cues that correspond with first and second asset insertion spots. In such an arrangement, these first level network platforms may subsequently disseminate the received content stream to downstream or second level network platforms (e.g., local head ends). In addition, at least two asset options are provided for a common (e.g., single) asset delivery spot of the content stream. In this arrangement, at least a portion of the first level network platforms are operative to identify the first cue (which may be restricted, encrypted, etc.) and independently select one of the asset options and insert the asset into the first asset delivery spot. Each platform subsequently disseminates/broadcasts the modified content stream with the selected asset option in the asset delivery spot. Typically, the modified content stream will still include the second cue to allow downstream platforms the ability to insert assets in the second insertion spot. Though discussed as utilizing first and second cues, it will be appreciated that the first cue may represent a first set of cues that are associated with national insertion spots and the second cue may identify a second set of cues associated with local insertion cues spots.

Providing the two asset options to the first level network platforms may be performed in a variety of different manners. For instance, in a first arrangement, the two asset options are provided in conjunction with delivering the content stream to these network platforms. For instance, such asset options may be broadcast with the content stream to the network platforms. In such an arrangement, the asset options may be incorporated into the content stream (e.g., multiplexed) and/or into parallel transmission bands. In another arrangement, the two or more asset options for the asset delivery spot may be forwarded to one or more of the network platforms prior to delivering the content stream to the network platforms. In this arrangement, the broadcast network platforms may be responsible for inserting one of the asset options into the first asset delivery spot. In any case, these arrangements allow a national-level asset provider to continue interfacing with the entity that generates the content stream as opposed to individually interfacing with multiple network platforms. In one arrangement, targeting criteria may be provided in conjunction with the asset options. Such targeting criteria may include, without limitation, geographic criteria as well as demographic criteria.

In one arrangement, the at least two asset options may be asset options of a single asset provider. In this regard, an asset provider may provide two or more asset options that are targeted to different regions and/or demographic groups and have these assets disseminated during a desired asset delivery spot.

To allow a network platform to insert an asset into the content stream, the utility may further include inserting a national cue for use by the network platforms. Such a national cue may be utilized to identify timing information associated with the asset delivery spot in a content steam. In this arrangement, the national or first cue may be specialized and/or restricted to allow insertion only by authorized platforms. Further, it will be appreciated that additional cues (e.g., local cues) may be incorporated into the content stream to identify timing associated with local asset insertion options. These cues may be differently formatted to allow one or more of the network platforms to identify the proper cue. Further, one or both the cues may be encrypted to prevent unauthorized replacement of assets in the content stream.

In another arrangement, the first cue may be erased by the first level network platform after an asset is inserted. In this regard, after the first level network platform utilizes the cue to identify an insertion spot and inserts an asset in that spot, the cue may be erased from the modified content stream to prevent use of that cue by downstream network platforms that may otherwise utilize such a cue to insert assets into the first insertion spot.

In one arrangement, a first level or national cue may be delivered via an available field in existing broadcast formatting. For instance, in analog broadcasts, or digital broadcasts that mimic analog format, a national cue may be inserted into an available vertical blanking interval (VBI). In one specific arrangement, such a cue may be inserted into an available channel of line 21 of the VBI. That is, such a cue may be inserted into the closed captioning VBI line, as there are typically one or two available channels within VBI for transmitting data, text, etc. An alternative arrangement would be to make use of a one of the other lines in the VBI (e.g. lines 10 to 20) to carry the data. In digital applications, such a national cue may also be inserted with a closed captioning bit stream as such bit streams typically contain excess data capacities. Alternatively, in a digital application, the national cue may be inserted as an MPEG data element into the MPEG transport stream.

The utility may be incorporated into differently formatted broadcast networks. For instance, in one arrangement, the network platforms may include repeater stations that repeat an over-air broadcast content stream to one or more network regions. In other arrangements, the network platforms may include various levels of network platforms, which may include over-air transmissions (e.g., affiliates) and/or hard-wired transmissions (network operators). In such an arrangement, a first level of network platforms may provide content to a second level of network platforms. For instance, affiliates and/or regional head ends may distribute content streams directly to local head ends and/or may utilize various intermediate platforms to distribute such content streams. In such an arrangement, first level network platforms (e.g., affiliates) may be operative to insert a national level asset into the content stream based on, for example, a first cue. Subsequently, second level network platforms (e.g., regional or local head ends) may receive the content stream, including the asset inserted by an upstream or first level network platform. In such an arrangement, a local head end may then insert local assets into the content stream such that, when disseminated to network users, the content stream may include assets inserted by an affiliate and/or regional head end as well as local assets inserted by the local head end. In such an arrangement, a national asset provider may provide different assets for different regions. Additionally or alternatively, such first level platforms may select between asset options provided for use in network-wide delivery spots of the content stream (e.g., national feed) based on geographic and/or demographic values associated with the platform.

In a further arrangement, the utility may be operative to receive information from one or more of the network platforms. For instance, such information received from a network platform may be indicative of a current network conditions (e.g., demographics of a current network audience). In this regard, in conjunction with generating a content stream, the content provider may select assets for dissemination during one or more asset delivery spot based on current network conditions.

According to another aspect, a utility is provided for use in connection with delivering assets to users of a broadcast network. The utility allows for multi-level or tiered insertion of assets. That is, insertions of assets of one or more types and/or at one or more locations within the broadcast network. The utility includes generating a content stream for dissemination to a plurality of network platforms of a broadcast network. In conjunction with generating the content stream, a first type of cue (e.g., a cue tone in an analog system, a cue message in a digital system, etc.) is inserted into the content stream. This first type of cue identifies a first insertion opportunity for a first asset type. A second type of a cue is also inserted into the content stream. Likewise, the second type of cue identifies a second insertion opportunity for a second asset type. The content stream, including the first and second types of cues, is delivered to the network platforms, which may then disseminate the content stream to a plurality of network regions.

In one arrangement, a first portion of the network platforms may utilize the first cue to select a first asset for insertion into the content stream. Accordingly, this first asset may be selected from a first set or type of assets (e.g., network-wide assets). For instance, this first set of assets may include a set of related assets. In one such arrangement, a national advertiser may provide multiple different assets for a common set of goods. Accordingly, the first portion of the network platforms may select amongst these different assets for the advertiser based on, for example, geographics and/or demographics associated with the region served by the network platform.

In a further arrangement, a second portion of the network platforms utilize the second type of cue to select a second asset for presentation with the content stream during a second insertion opportunity. For instance, the second set of assets may include regional and/or local assets. It will be further appreciated that the first and second portions of the network platform may be the same or different. In this regard, the first portion of the network platforms may include regional head ends, and the second portion of the network platforms may include local head ends. However, it will be further appreciated that some platforms may utilize both the first and second cues to insert different types of assets.

According to another aspect, a utility for use in connection with delivering assets to users of a broadcast network is provided. The utility may be utilized at a network platform and may entail identifying first and second cue types in a content stream received from a broadcast content provider. The first and second cue types may identify first and second asset insertion spots. Accordingly, the network platform may insert a first asset into the first asset insertion spot. The utility may then erase the first cue from the content stream and broadcast the modified content stream and inserted asset to downstream network platforms. These downstream platforms may then use the second cue to insert assets.

A step of identifying the first and/or second cue may further include identifying an encrypted signal within the content stream. For instance, it may be desirable to encrypt one or both cue types to prevent unauthorized use of the same. In one arrangement, such cues may be provided in an SCTE signal within the content stream. In another arrangement, cues may be provided in a VBI line.

It will be appreciated that the identification of different cue types may allow for insertion of different assets selected from different asset sets (e.g., national assets form national asset providers and local assets from local asset providers). For instance, a first set of assets may be provided such that a selected one of those assets may be inserted based on, for example, demographics and/or geographic information associated with the location and/or audience associated with the network platform performing the insertion.

According to another aspect, a utility is provided for use in connection with multilevel insertion of assets within a broadcast network. The utility includes receiving a content stream from a content provider where the content stream includes at least a first restricted cue and a second unrestricted cue to identify first and second asset insertion spots within the content stream. Upon identifying the restricted cue within the content stream, the utility is operative to modify the content stream based on the identified first restricted cue. This generates a modified content stream that may be broadcast to one or more downstream network platforms. This modified content stream typically includes the second unrestricted cue that allows for the downstream network platforms to insert one or more assets therein. Likewise, these downstream network platforms may disseminate the content stream to network users.

In a first arrangement, modifying the content stream includes decrypting the first restricted cue to identify timing in the content stream associated with the first asset insertion spot. That is, the exact location of the asset insertion spot within the content stream is identified. Upon such identification, the method may further include inserting a first asset into this insertion spot. In this regard, the modified content stream includes a first asset that is inserted into the first asset insertion spot prior to broadcasting the modified content stream to the downstream network platforms.

In another arrangement, modifying the content stream includes inserting a first asset into the first insertion spot and erasing the first restricted cue. In such an arrangement, the first asset is broadcast with a modified content stream to downstream network platforms. As the first restricted cue is removed from the content stream, downstream network platforms are unable to replace or identify the location of the first asset insertion spot.

According to another arrangement, modifying the content stream comprises replacing the first restricted cue with an unrestricted cue. In such an arrangement, replacement of the restricted cue with an unrestricted cue may allow for use of the asset insertion spot by downstream network platforms. In this regard, a first asset insertion spot that had previously been utilized, for example, for a national level asset may be authorized for use by downstream network platforms to provide, for example, local assets.

When a restricted cue is replaced with an unrestricted cue, the utility may further include a first network platform offering for sale the asset delivery spot associated with the restricted cue. Upon receiving an adequate bid for such a previously restricted spot, the first network platform may provide access to the restricted spot by making the restricted cue available to some or all downstream network platforms. In this regard, it will be appreciated that making the restricted cue available to a portion of the downstream network platforms may entail providing such downstream network platforms encryption information for use in accessing the cue. Alternatively, the first network platform may provide separate feeds to different downstream platforms. A first feed provided to non-paying downstream platforms may not provide access to the restricted cue whereas a second feed provided to paying downstream platforms may replace the restricted cue with an unrestricted cue.

Another aspect of the invention is directed to providing asset insertion instructions with a content stream such that network-wide asset delivery spots may be altered by individual network platforms in accordance with received instruction. The utility includes delivering a content stream having restricted and unrestricted asset delivery spots to a plurality of network platforms and providing asset insertion instructions to the network platforms. Such asset insertion instructions may provide instructions for a portion or all of the network platforms to use in selecting between provided assets and/or inserting stored assets. That is, such asset insertion instructions may include criteria that are used to dictate which network platforms utilize the instructions, how to access the restricted asset delivery spots (e.g., encryption keys, etc.) and/or dictate which asset is selected/inserted into an asset delivery spot. In one particular arrangement the asset insertion instructions may include a geographical criterion. Such a geographical criterion may identify regions in which an asset provider is interested in targeting. In this regard, network platforms matching the geographical criteria (e.g., within a specified geographic area, having a matching geographic code, etc.) may utilize the instructions. In contrast, network platforms that do not match the geographical criteria may ignore the instructions. Such instructions may instruct network platforms to insert an asset from a predetermined set of assets and or select between assets provided with the content stream. In either case, the network platforms may be allowed to select between available options based on the current conditions of the network platform. In one arrangement, the asset insertion instructions may be delivered with the content stream. In another arrangement, the asset insertion instructions may be delivered via a separate transmission channel (and/or medium) as the content stream.

In another aspect, a utility for use in connection with delivering assets to users of a broadcast network is provided wherein feedback information from the network may be utilized by a content provider to select one or more assets for provision with a content stream. In this regard, the utility includes receiving network user information from at least one of a plurality of network platforms of a broadcast network. Based on the network user information, the content provider may select one or more assets that are targeted towards a current network audience to generate a content stream that includes a selected asset for at least one delivery spot. Accordingly, the content stream may be delivered to a plurality of network platforms, which then may disseminate the programming stream to a plurality of network regions.

In the present aspect, it will be appreciated that the ability to dynamically insert assets at a network-wide level may allow for better tailoring a national feed to a current audience. Furthermore, such dynamic insertion may allow for inserting assets into programming streams where no feedback is available. For instance, satellite television feeds that are fed directly to consumers/network users may utilize information obtained from network platforms that allow for bi-directional communication with network users. For instance, a network platform of a cable television network (e.g., a local head end) may collect user information from current network users. This network user information may subsequently be provided to the content provider who provides a content stream to the network platform as well as other network platforms. Accordingly, the content provider may alter asset selection based on current network conditions for at least a portion of a broadcast network such that users in other portions of the network may be targeted. That is, the current feedback from a first portion of the network may allow for more effectively targeting users of the remainder of the broadcast network.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION

Figure 1:
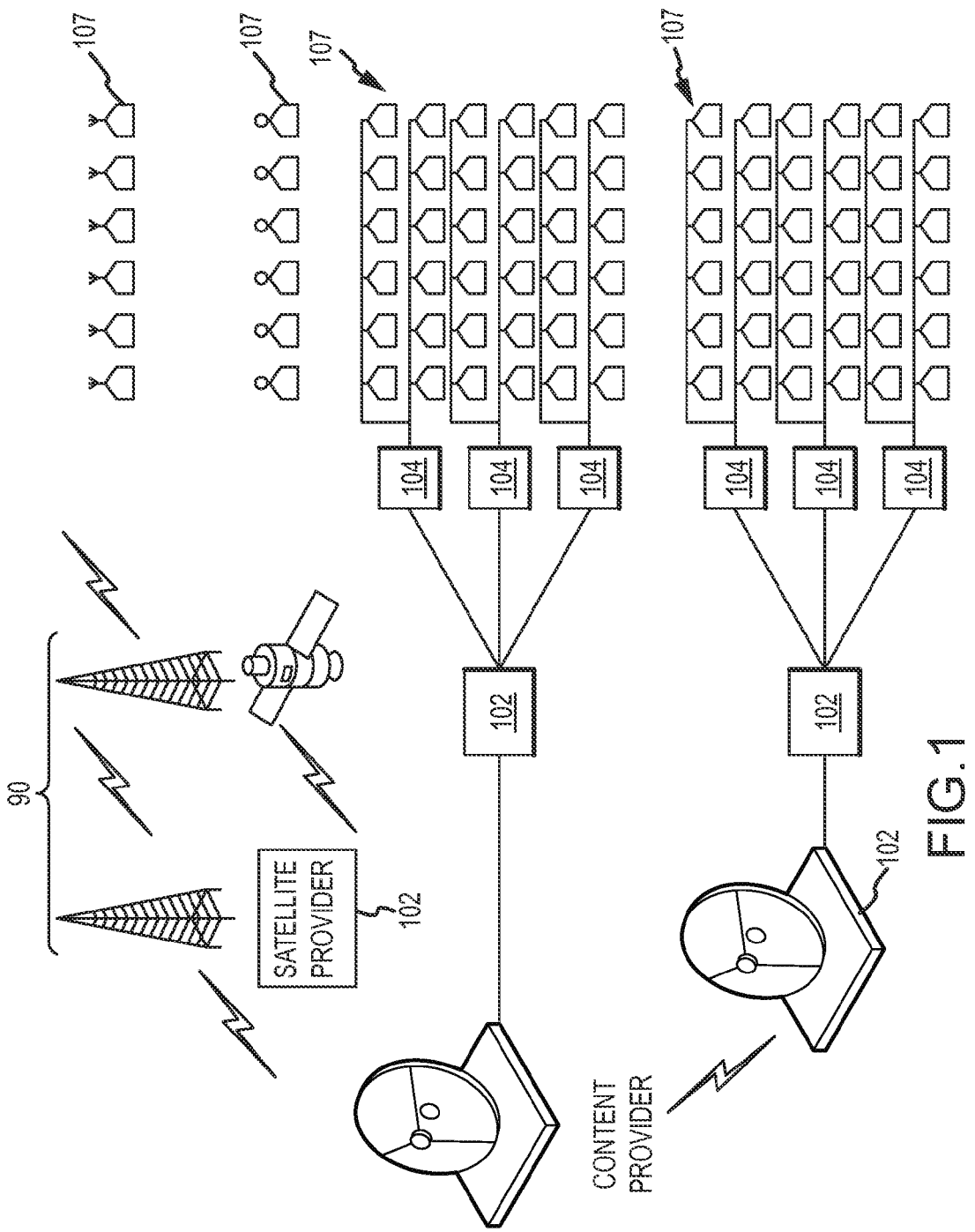
FIG. 1 illustrates major components of a cable television network.

The present invention relates to various structure and functionality for delivery of targeted assets and network monitoring for use in a communications network, as well as associated business methods. The invention has particular application with respect to networks where content is broadcast to network users; that is, the content is made available via the network to multiple users without being specifically addressed to individual user nodes in point-to-point fashion. In this regard, content may be broadcast in a variety of networks including, for example, cable and satellite television networks, satellite radio networks, IP networks used for multicasting content and networks used for podcasts or telephony broadcasts/multicasts. Content may also be broadcast over the airwaves though, as will be understood from the description below, certain aspects of the invention make use of bi-directional communication channels which are not readily available, for example, in connection with conventional airwave based televisions or radios (i.e., such communication would involve supplemental communication systems). In various contexts, the content may be consumed in real time or stored for subsequent consumption. Thus, while specific examples are provided below in the context of a cable television network for purposes of illustration, it will be appreciated that the invention is not limited to such contexts but, rather, has application to a variety of networks and transmission modes.

The targeted assets may include any type of asset that is desired to be targeted to network users. It is noted that such targeted assets are sometimes referred to as "addressable" assets (though, as will be understood from the description below, targeting can be accomplished without addressing in a point-to-point sense). For example, these targeted assets may include advertisements, internal marketing (e.g., information about network promotions, scheduling or upcoming events), public service announcements, weather or emergency information, or programming. The targeted assets may be independent or included in a content stream with other assets such as untargeted network programming. In the latter case, the targeted assets may be interspersed/interleaved with untargeted programming (e.g., provided during programming breaks) or may otherwise be combined with the programming as by being superimposed on a screen portion in the case of video programming. In the description below, specific examples are provided in the context of targeted assets provided during breaks in television programming. While this is an important commercial implementation of the invention, it will be appreciated that the invention has broader application. Thus, distinctions below between "programming" and "assets" such as advertising should not be understood as limiting the types of content that may be targeted or the contexts in which such content may be provided.

The following description is divided into a number of sections. In the Introduction section, the broadcast network and network programming environments are first described. Thereafter, an overview of the targeted asset environment is provided including a discussion of certain shortcomings of the conventional asset delivery paradigm. The succeeding section provides an overview of a targeted asset system for national asset targeting in accordance with the present invention highlighting advantages of certain preferred implementations thereof. Finally, the last section describes individual components of the system in greater detail and provides a detailed disclosure of exemplary implementations with specific reference to targeted advertising in a cable television environment.

I. Introduction

A. Broadcast Networks

The present invention has particular application in the context of networks primarily used to provide broadcast content, herein termed broadcast networks. Such broadcast networks generally involve synchronized distribution of broadcast content to multiple users. However, it will be appreciated that certain broadcast networks are not limited to synchronously pushing content to multiple users but can also be used to deliver content to specific users, including on a user pulled basis. As noted above, examples of broadcast networks include cable television networks, satellite television networks, and satellite radio networks. In addition, audio, video or other content may be broadcast across Internet protocol and telephony networks. In any such networks, it may be desired to insert targeted assets such as advertisements into a broadcast stream. Examples of broadcast networks used to delivery content to specific users include broadcast networks used to deliver on demand content such as VOD and podcasts. The present invention provides a variety of functionality in this regard, as will be discussed in detail below.

For purposes of illustration, the invention is described in some instances below in the context of a cable television network implementation. Some major components of a cable television network 100 are depicted in FIG. 1. In the illustrated network 100, broadcast content is distributed to network users via a plurality of network platforms 90. Such network platforms may vary by region, broadcast network and/or nationality. In one arrangement, the network platforms include repeater stations 92 that receive broadcast content (e.g., directly, over-air and/or via satellite transmissions) and repeat broadcast the content stream to network users. In another arrangement, the broadcast network provides broadcast content via a series of network platforms.

Such a series of network platforms may include regional/central network platforms as well local platforms. In a cable television network context, such regional/central network platforms may be represented by network affiliates and/or regional head ends 102. As will be appreciated, affiliates receive content from a particular content provider (e.g., ABC, CBS, etc.) and subsequently provide that content to network operators (e.g., multiple system operators or MSOs). Such MSOs may combine content from multiple providers at, for example, a regional head end. Each such regional head end may be operative to provide broadcast content (e.g., primary distribution) to a plurality of local head ends 104. Such local head ends 104 may then provide content (e.g., secondary distribution) to network users 107.

Figure 2:
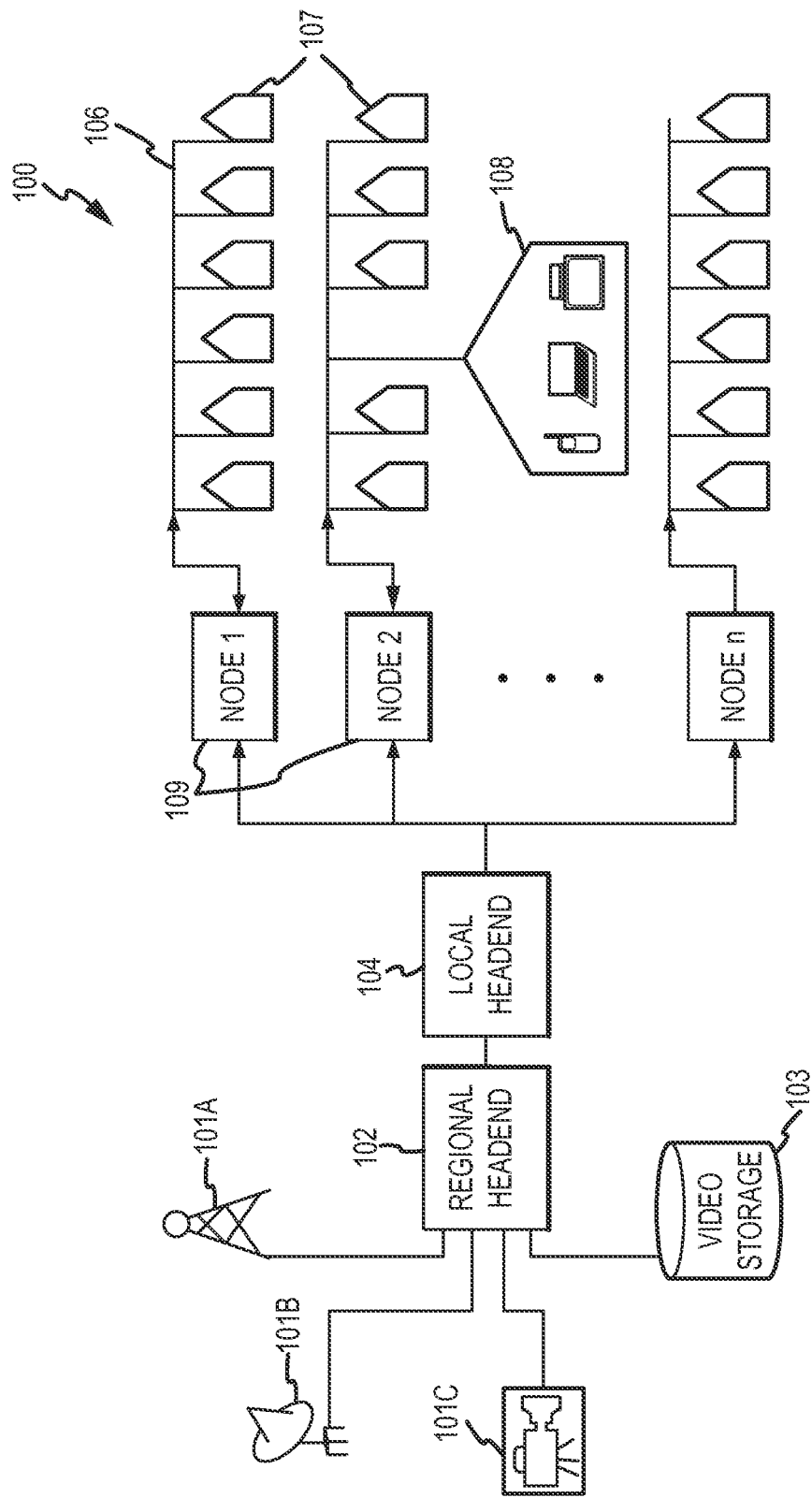
FIG. 2 illustrates a portion of the network of FIG. 1.

In any case, the network platforms 90 receive content from content providers and in turn provide this content to network users directly and/or via additional network platforms. In the portion of the network 100 illustrated in FIG. 2, it is noted the network platforms may obtain broadcast content from any of a number of sources 101A-C associated with various content providers. Additionally, broadcast content may be obtained from storage media 103 such as via a video server. The illustrated sources include an antenna 101A, for example, for receiving content via the airwaves, a satellite dish 101B for receiving content via satellite communications, and a fiber link 101C for receiving content directly from studios or other content sources. It will be appreciated that the illustrated sources 101A-C and 103 are provided for purposes of illustration and other sources may be utilized.

Generally, the network platforms 90 process the received content for transmission to network users. Among other things, the network platforms may be operative to amplify, convert and otherwise process the broadcast content signals as well as to combine the signals into a common cable for transmission to network users 107 (although graphically depicted as households, as described below, the system of the present invention can be used in implementations where individual users in a household are targeted). The network platforms can also process signals from users in a variety of contexts. The network platforms may thus be thought of as the control centers or local control centers of the cable television network 100. It will be appreciated that in networks that utilize multi-level network platforms (e.g., regional head ends 102 and local head ends 104) different levels of the network platforms may perform different functions. For instance, the regional head ends 102 may combine signals from different content providers while local head ends 104 may provide content to network users and/or receive signals/information from the network users. However, it will be appreciated that such local head ends may also be operative to insert local content from local content providers (e.g., local television stations) and/or local asset providers Typically, in the context of a cable television network, there is not a direct fiber link from the headend 102 to the customer premises equipment (CPE) 108 of the network users 107. See FIG. 2. Rather, this connection generally involves a system of feeder cables and drop cables that define a number of system subsections or branches. This distribution network may include a number of nodes 109. The signal may be processed at these nodes 109 to insert localized content, filter the locally available channels or otherwise control the content delivered to users in the node area. The resulting content within a node area is typically distributed by optical and/or coaxial links 106 to the premises of particular users 107. Finally, the broadcast signal is processed by the CPE 108, which may include a television, data terminal, a digital set top box, DVR or other terminal equipment. It will be appreciated that digital or analog signals may be involved in this regard.

Users employ the network, and network operators derive revenue, based on delivery of desirable content or programming. The stakeholders in this regard include programming providers, asset providers such as network-wide advertisers (who may be the same as or different than the programming providers), network operators such as Multiple Systems Operators (MSOs), local asset providers and users—or viewers in the case of television networks. Programming providers include, for example: networks who provide series and other programming, including on a national or international basis; local affiliates who often provide local or regional programming; studios who create and market content including movies, documentaries and the like; and a variety of other content owners or providers. Asset providers include a wide variety of manufacturers, retailers, service providers and public interest groups interested in, and generally willing to pay for, the opportunity to deliver messages to users on a local, regional, national or international level. Such assets may include: conventional advertisements; tag content such as ad tags (which may include static graphic overlays, animated graphics files or even real-time video and audio) associated with the advertisements or other content; banners or other content superimposed on or otherwise overlapping programming; product placement; and other advertising mechanisms. In addition, the networks may use insertion spots for internal marketing as discussed above, and the spots may be used for public service announcements or other non-advertising content. Network operators are generally responsible for delivering content to users and otherwise operating the networks as well as for contracting with the networks and asset providers and billing. Users are the end consumers of the content. Users may employ a variety of types of CPEs including television, set top boxes, iPOD™ devices, data terminals, satellite delivered video or audio to an automobile, appliances (such as refrigerators) with built-in televisions, etc.

All of these stakeholders have an interest in improved delivery of content including targeted asset delivery. For example, users can thereby be exposed to assets that are more likely of interest and can continue to have the costs of programming subsidized or wholly borne by asset providers. Asset providers can benefit from more effective asset delivery and greater return on their investment. Network operators and asset providers can benefit from increased value of the network as an asset delivery mechanism and, thus, potentially enhanced revenues.

Historically, broadcast content from a content provider has included programming and interleaved assets, which asset providers have paid to have included with the programming of the content providers. These interleaved assets have been disseminated network-wide in a content stream along with the programming of the content provider. For instance, in the case of television network content providers (e.g., ABC, CBS, etc.), content is simultaneously broadcast (e.g., typically via satellite) to various regional affiliates who each receive the identical network 'feed.' In this regard, when the content is a national feed (i.e., is broadcast network-wide), the interleaved assets may be termed network-wide assets or national level assets.

In addition, content providers have historically provided one or more cues within the content stream (e.g., programming and interleaved national assets) to allow local network platforms to insert local assets. Insertion of regional/local assets has typically been relegated to a few minutes per hour. Such local insertion has provided an important source of revenues for network operators. Further, such local insertion has allowed local asset providers the ability to tailor/target their assets to the putative interest of local network users. Such putative interests of local/regional network users may be inferred and/or determined from a number of sources, including, without limitation, geography and/or demographic information associated with a network region (e.g., a region served by a local head end).

Unfortunately, there has been no corresponding system to allow national level asset providers to target their assets to different regions and/or different demographic groups. That is, absent contracting for local network platforms to allow local insertion, national level asset providers have been required to provide a single asset for delivery in an asset delivery spot of the programming of a content provider. That is, national level asset providers have had no way to target their assets to different regions/demographics while providing their assets with a national feed. Systems are discussed below that allow for targeting of national level assets.

B. Scheduling

What programming is available on particular channels or other bandwidth segments at particular times is determined by scheduling. Thus, in the context of a broadcast television network, individual programming networks (e.g., content providers), associated with particular programming channels, will generally develop a programming schedule well into the future, e.g., weeks or months in advance. This programming schedule is generally published to users so that users can find programs of interest. In addition, this programming schedule is used by asset providers to select desired asset delivery spots.

Asset delivery is also scheduled. That is, breaks are typically built into or otherwise provided in programming content. In the case of recorded content, the breaks are predefined. Even in the case of live broadcasts, breaks are built-in. Thus, the number and duration of breaks is typically known in advance, though the exact timing of the spots may vary to some extent. In connection with regularly scheduled breaks, as discussed below, defined avail windows establish the time period during which certain breaks or spots occur, and for local insertion opportunities a cue tone or cue message signals the beginning of such breaks or spots. In practice, an avail window may be as long as or longer than a program and include all associated breaks. Indeed, avail windows may be several hours long, for example, in cases where audience demographics are not expected to change significantly over large programming blocks. In this regard, an MSO may merge multiple avail windows provided by programming networks.

More specifically, a break may include a series of asset delivery spots and the content of a break may be determined by a number of entities. As noted, some asset delivery (e.g., national level asset delivery) is distributed on a basis coextensive with network programming, e.g., on a national basis (e.g., network-wide). This asset delivery is conventionally scheduled based on a timed playlist. That is, the insertion of content has been centrally controlled to insert assets at defined times. Accordingly, the programming and interleaved national level assets have typically been provided by the programming networks as a continuous content stream without cues for asset insertion. For example, prime time programming on the major networks is often principally provided in this fashion.

In other cases, individual spots within a break are allocated for delivery of local assets that may be inserted by a Regional Operations Center (ROC), affiliate, super headend or local (headend, zone). In these cases, a cue or message identifies the start of the non-national (e.g., local) asset delivery spot or spots (a series of assets in a break may all trigger from one cue) for regional/local asset insertion. The cue generally occurs a few seconds before the start of the asset delivery insertion opportunity and may occur, for example, during a break in a content stream.

Figure 3:
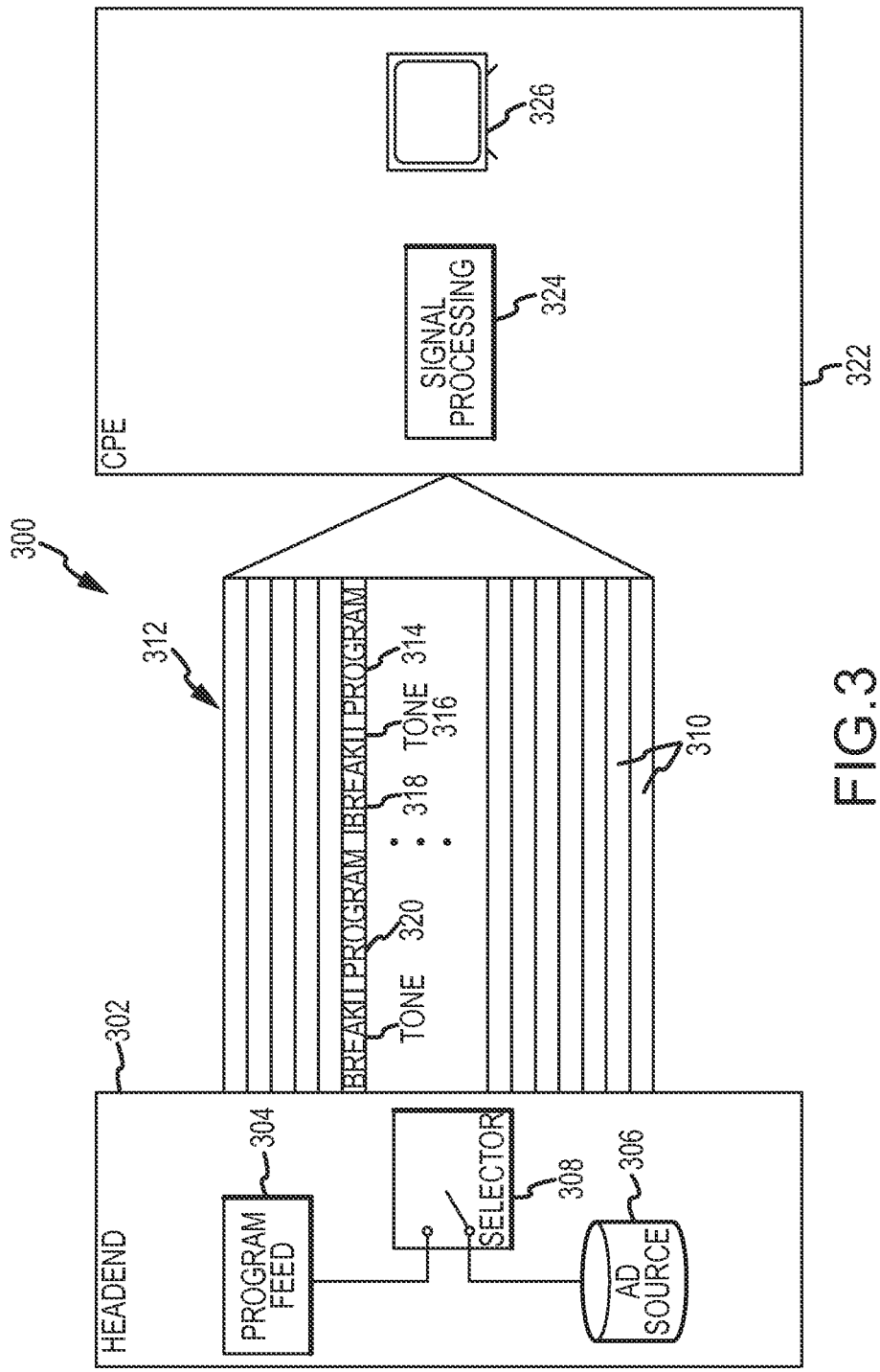
FIG. 3 illustrates asset insertion as accomplished at a local headend.

Conventionally, local asset insertion is accomplished at a local headend. This is illustrated in FIG. 3. In the illustrated system 300, the headend 302 includes a program feed 304 and an asset source 306. As noted above, the program feed 304 may be associated with a variety of programming sources such as video storage, an antenna, satellite dish or fiber feed from a studio or the like. The asset source 306 may include a tape library or other storage system for storing pre-recorded assets. A platform associated with the headend 302—in this case, denoted a selector 308—inserts programming from the program feed 304 and assets from the asset source 306 into the video stream of an individual channel 310. This is done for each channel to define the overall content 312 that is distributed to subscribers (or at least to a node filter). Typically, although not necessarily, the selector 308 effectively toggles between the program feed 304 and the asset source 306 such that the programming and assets are inserted in alternating, non-time overlapping fashion. Thus, as shown in FIG. 3, a particular channel may include a time segment 314 of programming followed by a local insertion cue 316 (which may occur, for example, during a programming segment, or during a time period of an asset provided with the programming stream, just prior to an insertion opportunity) to identify the initiation of a break 318. In response to the tone, the selector 308 is operative to insert assets into the programming stream for that channel. At the conclusion of the break 318, the selector 308 returns to the program feed to insert a further programming segment 320.

This content 312 or a filtered portion thereof is delivered to CPEs 322. In the illustrated embodiment the CPE 322 is depicted as including a signal processing component 324 and a television display 326. It will be appreciated that these components 324 and 326 may be embodied in a single device and the nature of the functionality may vary. In the case of a digital cable user, the signal processing component 324 may be incorporated into a digital set top box (DSTB) for decoding digital signals. Such boxes are typically capable of bi-directional messaging with the headend 302 which may be a significant consideration in relation to aspects of the functionality described below.

Network operators or local network affiliates can generally schedule the non-national assets (e.g., local assets) to be included within defined breaks or spots for each ad-supported channel. Conventionally, this scheduling is finalized ahead of time, typically on a daily or longer basis. The scheduled assets for a given break are then typically inserted at the headend in response to the cue or message in the programming stream. Thus, for example, where a given avail window includes three breaks (each of which may include a series of spots), the scheduled asset for the first break is inserted in response to the first cue, the scheduled asset for the second break is inserted in response to the second cue, and the scheduled asset for the third break is inserted in response to the third cue. As provided herein for national asset delivery, network signaling may be extended to provide signals identifying the start of a national spot or spots, to enable the inventive system to insert synchronous national asset options into designated bandwidth.

C. The Conventional Asset Delivery Paradigm

Conventional broadcast networks may include asset-supported and premium content channels/networks. As noted above, programming content generally comes at a substantial cost. That is, the programming providers expect to be compensated for the programming that they provide which has generally been developed or acquired at significant cost. That compensation may be generated by asset delivery revenues, by fees paid by users for premium channels, or some combination of the two. In some cases, funding may come from another source such as public funding.

In the case of asset-supported networks, the conventional paradigm involves time-slot buys. Specifically, asset providers generally identify a particular program or time-slot on a particular network where they desire their assets to be aired. The cost for the airing of the asset depends on a number of factors, but one primary factor is the size of the audience for the programming in connection with which the asset is aired. Thus, the standard pricing model is based on the cost per thousand viewers (CPM), though other factors such as demographics or audience composition are involved as discussed below. The size of the audience is generally determined based on ratings. The most common benchmark for establishing these ratings is the system of Nielsen Media Research Corporation (Nielsen). One technique used by Nielsen involves monitoring the viewing habits of a presumably statistically relevant sampling of the universe of users. Based on an analysis of the sample group, the Nielsen system can estimate what portion of the audience particular programs received and, from this, an estimated audience size for the program can be projected. Thus, the historical performance of the particular program, for example, as estimated by the Nielsen system, may be used to set asset delivery prices for future breaks associated with that program.

Figure 4:
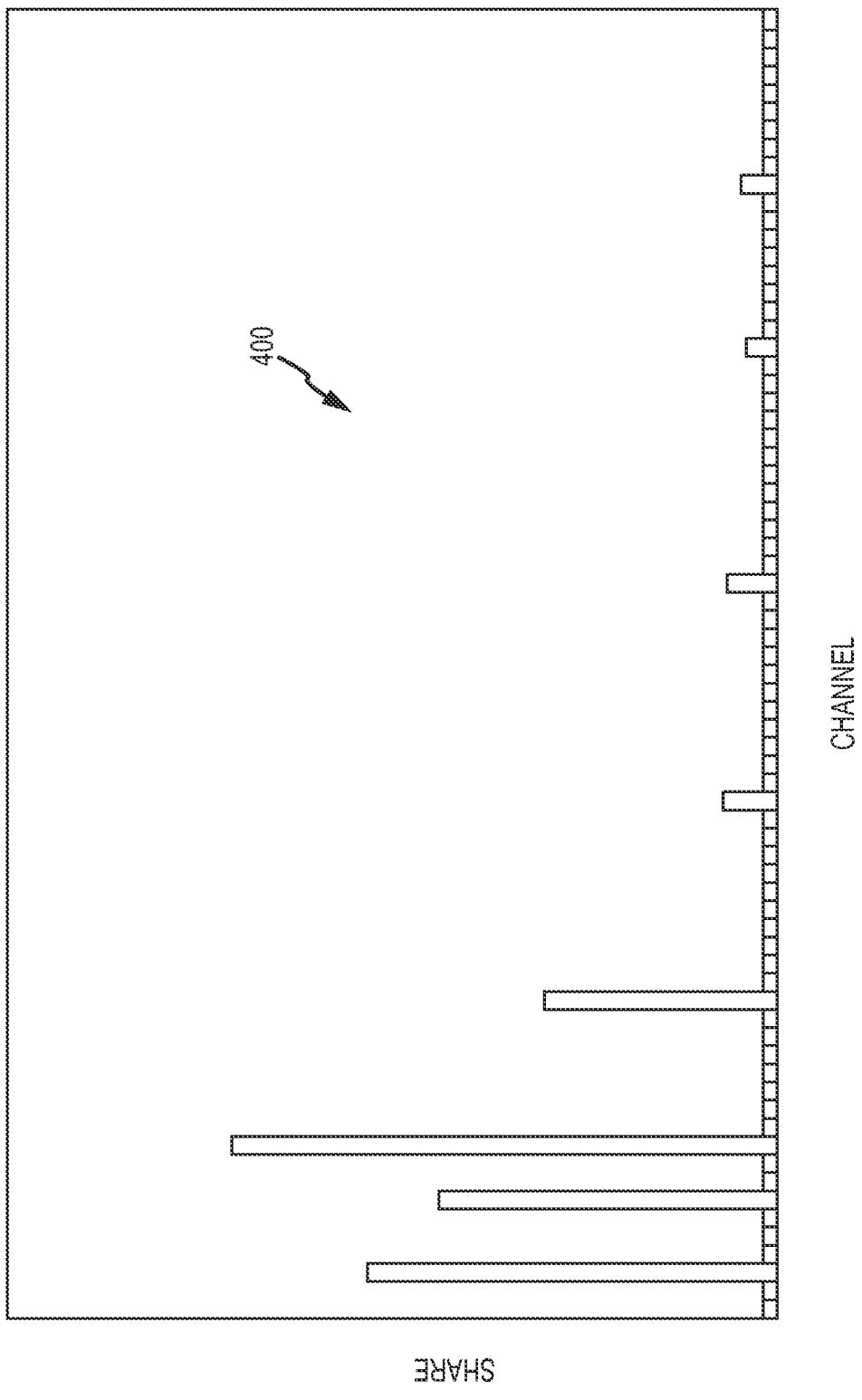
FIG. 4 illustrates exemplary audience shares of various networks as may be used to set asset delivery prices for future breaks associated with the program.

In practice, this results in a small number of programming networks being responsible for generating a large portion of the overall asset revenues. This is graphically depicted in FIG. 4, which generally illustrates this phenomenon, although it is not based on actual numbers. As shown in FIG. 4, it is often the case that three or four programming networks out of many available programming networks garner very large shares whereas the remaining programming networks have small or negligible share. However, by allowing national asset providers to target different regional and/or demographic groups, the revenue produced by the large share networks may be further enhanced while permitting asset providers to better target network users (i.e., potential consumers)

As noted above, the pricing for asset delivery depends on the size of the viewing audience and certain other factors. One of those factors relates to the demographics of interest to the asset provider. In this regard, a given program will generally have a number of different ratings for different demographic categories. That is, the program generally has not only a household rating, which is measured against the universe of all households with televisions, but also a rating for different demographic categories (e.g., males 18-24), measured against the universe of all members of the category who have televisions. Thus, the program may have a rating of 1 (1%) overall and a rating of 2 (2%) for a particular category. Typically, when asset providers buy a time-slot, pricing is based on a rating or ratings for the categories of interest to the asset provider. This results in significant inefficiencies due to poor matching of the audience to the desired demographics. In instances where two or more assets may be provided for a given time slot, the inefficiencies may be reduced.

II. System Overview

A. The Targeted Asset Delivery Environment

Against this backdrop described in the context of the conventional asset delivery paradigm, a system embodying the present invention is described below. The inventive system, in the embodiments described below, allows for delivery of nationally targeted assets such as advertising so as to address certain shortcomings or inefficiencies of conventional broadcast networks. Generally, such national targeting entails delivering varied assets to desired regions or groups of individuals. The nationally targeted assets may be targeted based on demographic information, psychographic information, geographic information, or any other information that may be relevant to an asset provider in identifying a target audience.

Such nationally targeted assets are typically provided in conjunction with programming. In this regard, it is recognized that programming is a highly imperfect mechanism for targeting of assets. For example, even if user analysis indicates that a particular program has an audience comprised sixty percent of women, and women comprise the target audience for a particular asset, airing the asset on that program will result in a forty percent mismatch. That is, forty percent of the users potentially reached may not be of interest to the asset provider and pricing may be based only on sixty percent of the total audience. Moreover, ideally, targeted asset delivery would allow for targeting with a range of granularities. For example, it may be desired to target a group, such as based on a geographical grouping, a household characterization or even an individual user characterization. The present invention accommodates targeting of assets provided with programming.

Figure 5:
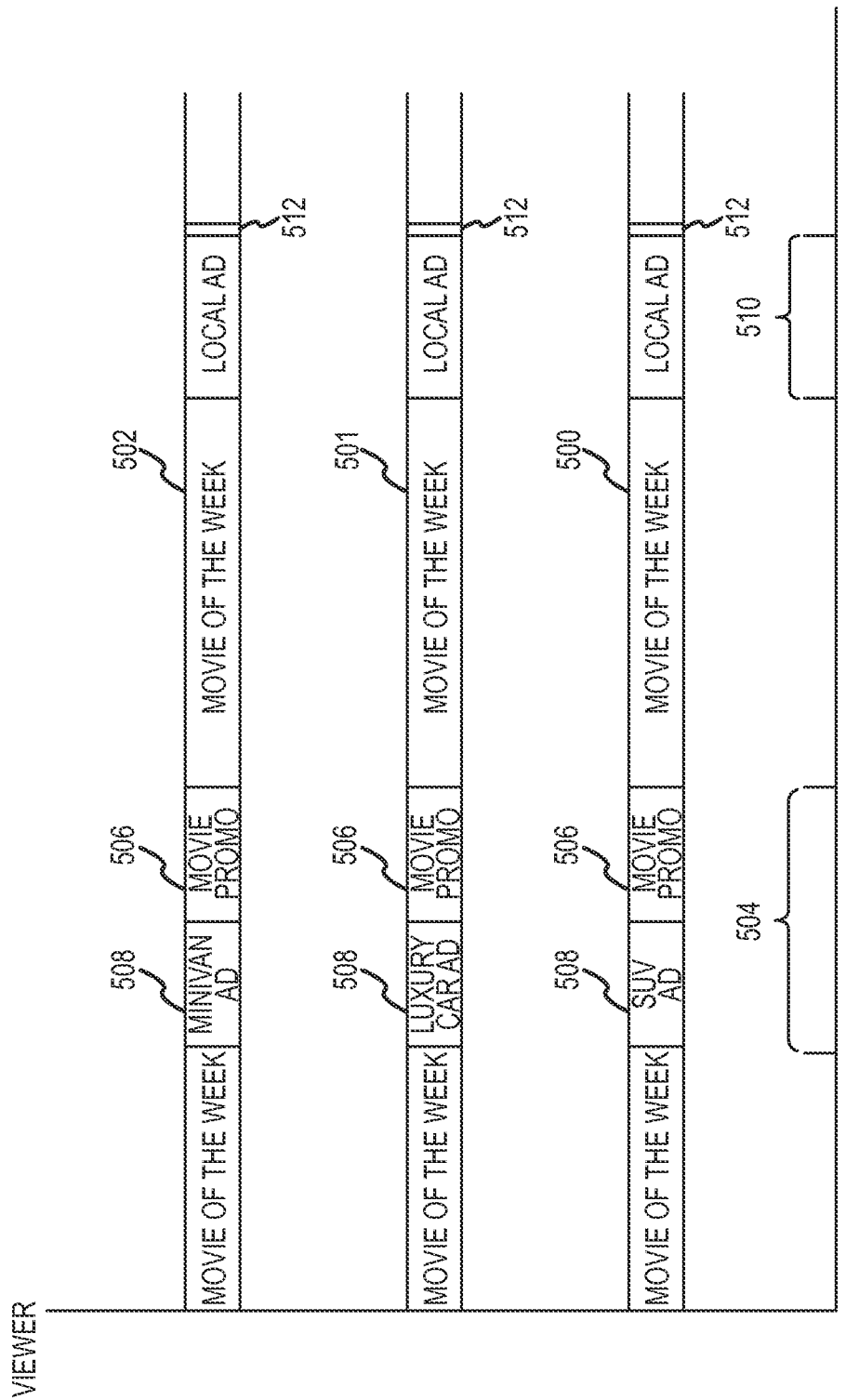
FIG. 5 illustrates delivery of different assets to different users watching the same programming channel.

FIG. 5 illustrates one embodiment of targeted asset delivery supported in accordance with aspects of the present invention. Specifically, FIG. 5 illustrates the dissemination of different national assets, in this case ads, in content streams of different network platforms 500-502 (e.g., affiliates) serving different network regions where network users are watching the same programming channel. As shown, three different network platforms 500-502 are depicted as broadcasting the same programming (i.e., received from a common content provider), in this case, denoted "Movie of the Week." At a given break 504, the network platforms may each provide a different asset package.

For instance, a first national asset provider may purchase a first asset delivery spot 506 of the break 504, and a second national asset provider may purchase a second asset delivery spot 508. The first asset provider may advertise a common product/service to the different regions of the network (e.g., advertise network-wide). Accordingly, a common ad 'movie promo' may be seen by all network users irrespective of their location.

In contrast, the second national asset provider (e.g., a motor vehicle company) may purchase a spot and then provide different asset options for the spot (e.g., minivans, luxury cars, SUVs, etc.) for dissemination to different regions of the network. Alternatively, separate advertisers may collectively purchase a single spot (e.g., 508) and then provide different ads for their respective products such that different regions and/or demographic groups receive ads of different asset providers. It will be appreciated that these different asset packages may be targeted to different audience demographics and/or to different network regions. In this manner, assets are better tailored to viewers of a given program who may fall into different demographic or geographic groups.

In a subsequent break 510, which is proceeded by a local cue 512, a local asset delivery spot is provided. During this break 510, the network platforms may selectively replace content of the content stream with local/regional assets. That is, the network platforms 500-502 or local network platforms (e.g., local head ends, node filters, etc.) may each insert a local/regional asset into their respective content streams.

In order to allow the substitution of network-wide assets (e.g., advertisements) provided in the network feed, it is necessary to provide some indication of the start and finish times of the breaks within the programming. That is, a cue must be provided that allows different network platforms (e.g., affiliates) to identify an upcoming break and elect to either ignore the opportunity to replace an asset in that break or to substitute a default asset within that break with another asset. That is, currently, national feeds that include programming and advertisements typically do not provide any indication of the location or length of national level assets. That is, the programming and national level advertisements are a continuous feed without any cues. Historically, this has prevented any downstream operator (e.g., head end) from substituting a local asset for a national asset. This has to some extent served both the content providers and national level asset providers. Specifically, the content providers have been able to charge more for a national level asset insertion spot due to the ability to guarantee that such assets will not be replaced. Likewise, national level asset providers have been guaranteed nationwide dissemination to consumers of broadcast programming.

However, the inability to replace these assets has prevented such asset providers from providing different asset options to different geographic regions. Accordingly, provided herein are systems and methods (i.e., utilities) that permit authorized replacement of national level assets in a content stream provided by a content provider.

National asset targeting can be implemented using a variety of architectures in accordance with the present invention. For example, nationally targeted asset insertion can be implemented at the network platforms and/or at the CPEs. Various implementations may involve a forward-and-store functionality. In such instances a network platform may receive national assets prior to receiving a content stream. Accordingly, the platform may insert one or more of the national assets at predetermined times (e.g., defined by a cue) and/or in accordance with information provided with the content stream.

In another embodiment, asset options may be transmitted from a content provider synchronously with a given break in a content stream for which targeted asset options are supported. In this arrangement, the network platforms and/or CPEs include a selector, which is operative to switch to an asset transmission band associated with a desired asset at the beginning of a break and to return to the programming band at the end of the break. The selector may hop between transmission bands (between asset bands or between an asset band and the programming band) during a break to select the most appropriate assets. Such selection may be based on geographic and/or demographic information.

As a further alternative, the determination of which national asset to provide with a content stream may be made dynamically based on information gathered by one or more network platforms. For example, an asset may be selected based on, for example, current network conditions, including, without limitation, current audience size and/or audience composition.

In any embodiment, it may be desirable that access to a cue that provides access to a previously un-accessible insertion spot (e.g., national insertion spot) be limited to authorized network platforms. For instance, it may be desirable that only network affiliates be able to identify breaks within programming that, upon initial delivery, carry nationwide assets. In various different embodiments disclosed herein, such access may be limited by encryption of the cue signal and/or by the ability of first level platforms to erase a cue signal associated with a national insertion spot. In the latter regard, an authorized platform such as an affiliate may identify a national level cue and replace an asset with an authorized replacement asset and thereafter erase the network cue signal from the network feed. After erasing such a cue, the platform (e.g., affiliate) may provide the network feed with the substituted asset to subsequent network platforms without the national level cue. As will be appreciated, by removing such a national level cue, any downstream/subsequent replacement of the inserted asset is prevented. Accordingly, such systems allow for national level asset providers to provide some granularity to their targeted assets while maintaining some security in the dissemination of those assets to network users.

B. System Architecture

In one implementation, the system of the present invention involves the transmission of two or more national asset options in time alignment or synchronization with an asset delivery spot in programming of a content stream provided by a content provider. In this implementation, the asset options are at least partially provided via separate bandwidth segments. For instance, a first asset option may be provided in the same bandwidth segment as the programming of the content stream and a second (e.g., or third or more) asset option may be provided in a parallel bandwidth segment. This is graphically illustrated in FIG. 6A.

Figure 6A:
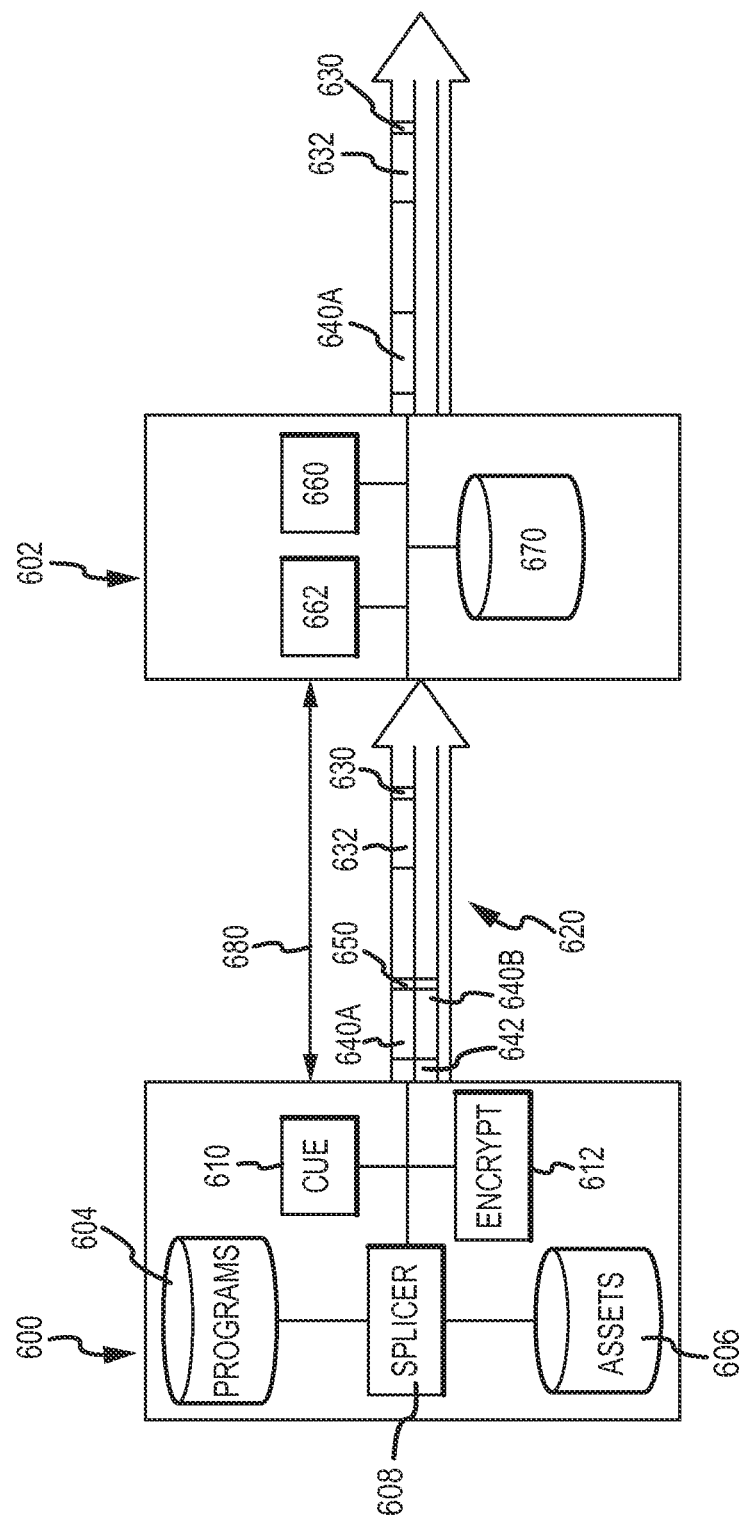
FIG. 6A illustrates insertion of different national asset portions at a content provider.

As shown in FIG. 6A, a content provider 600 generates a content stream that is received by one or more network platforms 602 (only one shown). The content stream 620 includes programming and interleaved assets. Accordingly, the content provider 600 includes a programming feed, which may include, for example, live feeds as well as previously recorded programming. In addition, the content provider 600 includes an asset database 606 that includes assets provided by asset providers (e.g., national level asset providers) for interleaving with the content stream 620. Accordingly, the content provider utilizes a splicer 608 to selectably interleave national level assets at predetermined asset delivery spots 640, 642 within the programming in order to generate the content stream 620. That is, national level assets are interspersed between programming segments.

In addition, the content provider 600 utilizes a cue generator 610 in order to insert one or more cues within the content stream 620. For instance, local insertion cue(s) 630 alert network platforms of upcoming local asset insertion spots 632 that allow for inserting one or more local assets into the content stream prior to provision of the content stream of network users. Typically, the content provider 600 includes a national level asset in the content stream 620 during the local asset insertion spot 632 associated with the local cue 630. That is, in a default situation where a regional or local network platform does not insert a local asset into the local asset insertion spot, network users will receive the default national asset that is associated with the insertion spot.

In the present embodiment, the content provider 600 provides one or more additional asset options for each national asset insertion spot 640, 642. For instance, during the first asset insertion spot 640, the content provider may provide a second asset option in a parallel transmission band with a first asset option included within the transmission band. In this regard, first and second assets in the first national insertion spot 640 are transmitted in synchrony with the content stream 620.

As discussed above, these assets in the first asset delivery spot 640 may be targeted towards different geographic regions and/or demographic groups. In this regard, the network platform 602 may be operative to identify asset delivery spots where more than one asset is available. Accordingly, the network platform 602 may utilize a selector 660 or tuner to select a transmission band associated with the asset that will be output to subsequent network platforms and/or to network users. Accordingly, the network platform 602 may need an indication that a national asset delivery spot is upcoming where more than one national level asset is available for delivery. Accordingly, in the present arrangement, the content provider 610 may insert a national insertion cue 650 into the content stream 620 that indicates an upcoming asset delivery spot for which more than one national asset is available.

In one arrangement, a national cue may be delivered via an available field in existing broadcast formatting. For instance, in analog broadcasts, or digital broadcasts that mimic analog format, a national cue may be inserted into an available vertical blanking interval (VBI). In one specific arrangement, a national cue may be inserted into an available channel of line 21 of the VBI. That is, such a national cue may be inserted into the closed captioning VBI line, as there are typically one or two available channels within VBI for transmitting data, text, etc. An alternative arrangement would be to make use of a one of the other lines in the VBI (e.g. lines 10 to 20) to carry the data. In digital applications, such a national cue may also be inserted with a closed captioning bit stream as such bit streams typically contain excess data capacities. Alternatively, in a digital application, the national cue may be inserted as an MPEG data element into the MPEG transport stream.

It will be appreciated that the ability to incorporate a national insertion cue into existing broadcast formatting may allow implementation of the process into existing network structures. This may allows for providing target asset delivery in existing networks (e.g., some foreign networks) that were previously limited to distribution of network-wide assets.

To prevent unauthorized replacement of the national level assets provided with the content stream 620, it may be desirable that the national insertion cue 650 is encrypted. Accordingly, the content provider may include an encryption device 612 that is operatively connected to the cue generator 610. In this arrangement, cues that signify upcoming local insertion spots (e.g., cue 630) may not be encrypted while cues that signify upcoming insertion spots/asset options for national level assets (e.g., cue 650) may be encrypted. Accordingly, the network platforms that receive the content stream 620 and which are authorized to select between national level assets for subsequent presentation to downstream network platforms and/or to network users, may include an encryption detection device 662 that monitors the incoming content stream (or monitors the content stream as it is output from storage) and identifying encrypted cues. In such an arrangement, the encryption detection device 662 may include appropriate keys (e.g., previously provided by the content provider) that allow the network platform 602 to identify the time and duration of the upcoming national asset delivery spot including two or more national level assets.

In order to select between upcoming asset options, the network platform 602 may also receive information with the content stream 620 (e.g., metadata, private MPEG data, SCTE signals, etc.) that provide an indication of the content and/or targeted audience for upcoming asset options. Accordingly, the network platform may utilize this information with demographic and/or geographic information (e.g., stored information 670) associated with the network platform 602 in order to select an appropriate national level asset for output to subsequent network platforms and/or network users. For instance, in a content stream 620 having first and second asset options for an upcoming asset delivery spot 640, one of the asset options may be directed towards a first region of the network and a second asset option may be directed towards a second region of the network. Accordingly, the network platform 602 may compare the specified network regions of the upcoming assets with region information (e.g., geographic information) associated with the network platform 602 receiving the content stream. Accordingly, the network platform 602 may select the appropriate asset (e.g., 640*b*) and, if necessary, use a selector to switch transmission bands at the beginning of the asset delivery spot 640 if the asset selected is not in the primary transmission band associated with the programming. Likewise, at the end of the asset delivery spot(s), the network platform may utilize the selector to switch back to the primary transmission band such that the platform switches back to the programming within the content stream 620.

Figure 6B:
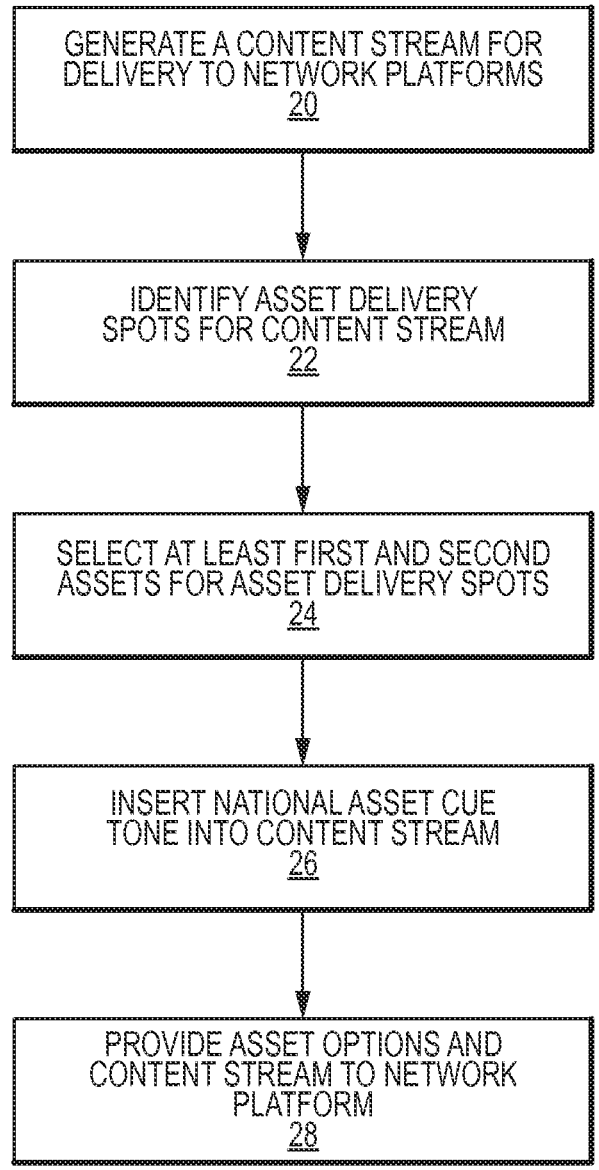
FIG. 6B illustrates one protocol that may be utilized with the system of FIG. 6A.

FIG. 6B provides protocol that may be utilized in conjunction with the system illustrated in FIG. 6A. Initially, the content provider may generate a content stream for delivery to a plurality of network platforms. Such generation 20 may include generating programming (e.g., movies) or recording live events. In any case, the content stream is generated for provision to network platforms such that those network platforms may disseminate the content stream to a plurality of network regions. Generating the content stream further includes identifying 22 asset delivery spots within the content stream. Such identification 22 may include identifying local asset delivery spots as well as national asset delivery spots. For at least a first national asset delivery spot, the process also includes selecting 24 at least first and second national level asset options for provision with the content stream. In this regard, one or more of the network platforms that are operative to receive the content stream may be further operative to select one of the asset options. Such selection may be based on geographic and/or demographic factors associated with a desired audience. The process further includes inserting 26 a national asset delivery cue that alerts network platforms of an upcoming option for selecting between available national asset options. This step may further include encrypting the cues such that only authorized network platforms are able to identify insertion times associated with the national assets. In addition, this step may include providing encryption keys to some or all of the authorized network platforms (e.g., affiliates) that will receive the content stream. Typically, such encryption keys may be individually forwarded via a separate communications link. Inserting a cue may further include inserting local insertion cues into the content stream. In one arrangement, these first and second cues (e.g., national and local) are of different types. In this regard, differently configured platforms may utilize the different cues. For instance, a regional head ends may utilize the first cue to select a national asset for provision with the content stream whereas local head ends may utilize the second cue type for insertion of local assets into local content streams.

Once the assets are selected and the cue is inserted into the content stream, the asset options and the content stream are provided 28 to network platforms. The provision of the content stream and the asset options may be performed in synchrony. In this regard, the asset options may be broadcast in conjunction with the content stream utilizing, for example, parallel transmission bands. Alternatively, the asset options may be multiplexed into a common transmission band. In a further arrangement, provision of the asset options may include forwarding one or more asset options to one or more pre-selected network platforms such that the network platforms have the option to insert the forwarded asset option in the asset delivery spot.

In this latter implementation, national level asset providers may dictate which network platforms output their assets. In this regard, national level asset providers may select different network platforms based on the region of the platforms and/or demographic groups associated with the network platforms. It will be further appreciated that, while the functionality to select between national assets may be performed at an upper level network platform (e.g., affiliate), the functionality to select between national level assets may also reside within downstream network platforms such as, for example, regional or head ends.

As the national level asset providers are able to dictate which platforms output their assets, there may be no need for the network platforms to report to the content provider which asset was selected. However, in a further embodiment, the network platform 602 may be operative to dynamically select between the asset options within the asset delivery spot 640 based on current network conditions. For instance, the network platform 602 may be operative to maintain bi-directional communications with network users. That is, the network platform 602 may be operative to determine audience parameters for a current network audience. In this regard, the network platform may be operative to poll a statistically significant sample of current network users in order to identify the makeup of the current network users who are receiving broadcast content. The network platform may utilize such information to dynamically select the most appropriate asset provided with the content stream 620 for a current network audience. The ability to receive such audience information from broadcast network is set forth in U.S. patent application Ser. No. 11/332,771 entitled, "Voting and Headend Insertion," having a filing date of Jan. 12, 2006, the entire contents of which is incorporated by reference herein. Additional mechanisms to receive such audience information are set forth in U.S. Pat. No. 7,546,619, entitled, "Voting and headend insertion model for targeting content in a broadcast network," issued Jun. 9, 2009, the entire contents of which is incorporated by reference herein.

In the dynamic insertion implementation, the network platform 602 may be operative to report which asset was selected for a given asset insertion spot. That is, the network platform 602 may contact the content provider 610 via any appropriate communications link 680 to report this information such that the content provider may adjust billing for the asset delivery spot. That is, if the asset delivery spot is utilized by separate asset providers, these separate asset providers may be charged differently based on their share of the network users who receive the programming. In contrast, if a single network asset provider utilizes parallel asset delivery options for different versions of their product(s), there may be no need to report selection information to the content provider.

Figure 7A:
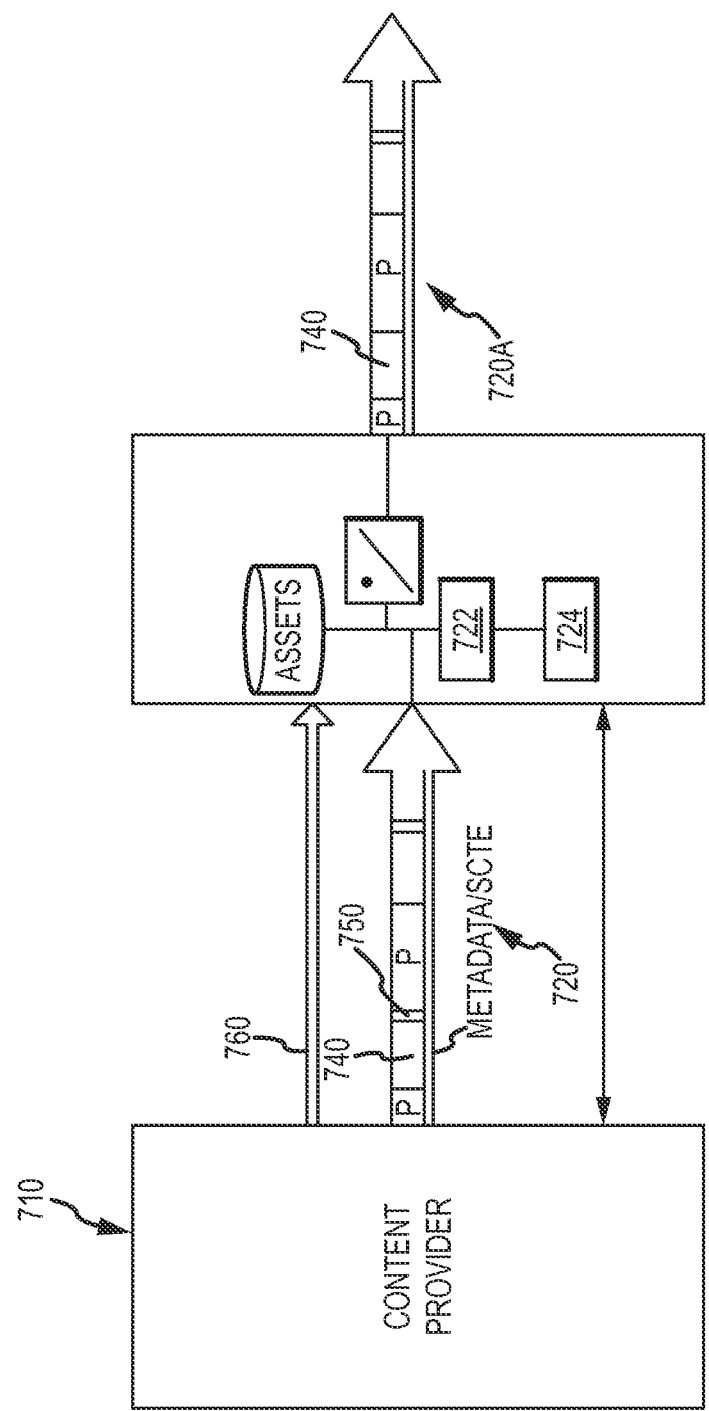
FIG. 7A illustrates insertion of different national asset options at a network platform.

According to another implementation illustrated in FIG. 7A, a content provider 710 utilizes a forward-and-store function to allow one or more network platforms (only one illustrated) to selectively replace a default national level advertisement within the content stream 720 received by the platform 702. In this arrangement, the requirement of parallel transmission bands for providing asset options to a network platform may be eliminated. As shown in FIG. 7A, a network platform 702 receives a programming stream 720 from a content provider 710. In the illustrated implementation, a second communication link 780 is established between the network platform 702 and the content provider 700 to provide national level assets to the network platform 702. The second link 780 may be established at a time prior to delivery of the content stream 720. However, it will be appreciated that the second link 780 may utilize a common transmission band as the content stream while being utilized at a different time or may constitute a separate communications link therebetween. In a further arrangement, assets may be physically delivered to participating network platforms. What is important is that the content provider 710 is able to provide national level assets to the network platform 702 such that the platform 702 may store these assets and subsequently insert national level assets into a received programming stream 720.

In the illustrated implementation, the content stream 720 is provided to the network platform 702. As shown, programming is provided with an interleaved programming break 740 including at least a first asset delivery spot. This programming break 740 is proceeded by a national insertion cue 750. Accordingly, as discussed above, the network platform may include an encryption detection device 722 that allows for monitoring a received content shown to identify an encrypted national insertion cue and thereby identifying the time and duration of an upcoming break 740. In addition, the network platform 702 may also identify metadata and/or SCTE signals within the content stream 720. Such signals may identify the targeted audience parameters (e.g., demographic information and/or geographic constraints) for the default national level asset included within the programming break 740. Accordingly, the network platform 702 may utilize this information to determine whether the default asset included within the programming break 740 is most suitable for delivery to the region and/or network users serviced by the network platform 702 or if an alternate asset(s) would be more appropriate. Furthermore, it will be noted that the metadata may also indicate what types of alternate national level assets may be inserted into the content stream. In instances where it is determined that a different asset may be more appropriate based on region and/or demographic considerations of the network platform, the network platform 702 may utilize a selector 760 switch between the content stream 720 and an asset input stream interconnected to the asset database 762 such that a default asset within the content stream 720 may be replaced with a stored national level asset deemed more suitable for delivery with the content. Stated otherwise, the content stream may include asset insertion information or instructions that direct the insertion of assets into the content stream by a portion or all of the network platforms. Such asset insertion instructions may be provided by asset providers who purchase an asset delivery spot.

Asset insertion instructions may provide instructions for a portion or all of the network platforms to use in selecting between assets received in the programming content and/or inserting stored assets. That is, such asset insertion instructions may dictate which network platforms utilize instructions and/or dictate which asset is selected/inserted into an asset delivery spot. In one exemplary arrangement, the asset insertion instructions may include a geographical criterion. Such a geographical criterion may identify regions in which the asset provider is interested in specially targeting. In this regard, network platforms matching the geographical criteria (e.g., within a specified geographic area, having a matching geographic code, etc.) may utilize the instructions. In contrast, network platforms that do not match the geographical criteria may ignore the instructions. Such instructions may instruct network platforms to insert an asset from a predetermined set of assets and or select between assets provided with the content stream. In either case, the network platforms may be allowed to select between available options based on the current conditions of the network platform. Alternatively, the instructions may be fixed instructions that dictate the exact asset that is to be delivered by the network platforms.

In order to prevent further utilization of the national level cue (e.g., encrypted or otherwise), the platform 702 may further include cue erasing functionality. That is, the platform 702 may include a cue eraser module 724 that is operative to remove/scrub the national level cue from the content stream 720 prior to provision of the content stream to subsequent network platforms. In this regard, the platform 702 may be operative to identify a national level insertion cue 750 to select between national level asset options within the content stream itself 720 and/or substitute a default asset provided with the content stream with stored assets and subsequently broadcast a modified content stream 720a to subsequent/downstream network platforms. This modified content stream 720a is free of the national level insertion cue. In this regard, the modified content stream 720a includes selected asset interleaved between programming segments where the metadata/SCTE signal or other cue information has been scrubbed from the modified content stream 720a. Accordingly, subsequent network platforms will receive this content stream 720a without information necessary to replace the asset inserted by the platform. As will be appreciated, this functionality prevents unauthorized downstream replacement of such assets.

It will be further appreciated that, in this implementation, the national level assets within the asset database 762 of the network platform 702 may be limited by a number of considerations. For instance, various assets may be limited to certain insertion times within a programming stream. For instance, for a first break within a programming slot (e.g., 7:00 to 7:30) there may be only one alternate asset that may be inserted during the first asset insertion spot. In any case, the ability of the network platform to select and insert assets stored at the network platform may require that the network platform report to the content provider which assets were selected and inserted into the content stream and subsequently disseminated to network users. Such reporting may be performed via the communication link 780 through which the platform receives the national level assets for storage or via any other appropriate communications link.

Figure 7B:
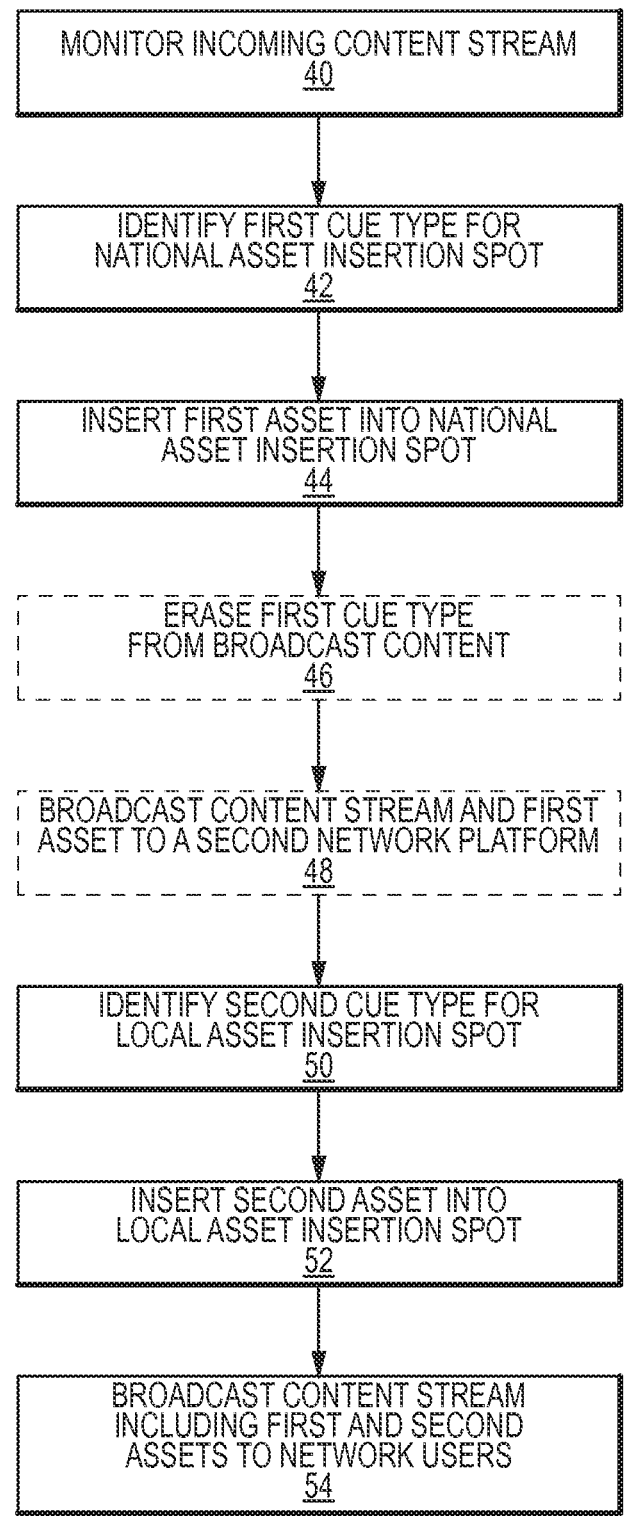
FIG. 7B illustrates one protocol that may be utilized with the system of FIG. 7A.

FIG. 7B illustrates a protocol for use by a network platform receiving a content stream from a content provider where the content stream includes one or more national level insertion opportunities that allow for selecting or inserting one or more national level assets. The process includes monitoring 40 an incoming content stream that includes programming and interleaved assets and/or asset insertion spots. The method further includes identifying 42 a first cue type that identifies a first asset insertion spot. In one arrangement, this includes identifying an encrypted cue that identifies a national asset insertion opportunity. Accordingly, the method may further include inserting 44 a first asset from a first set of assets into the first asset insertion spot. In one arrangement, the method includes erasing 46 the first cue from the content stream. The content stream including the first asset inserted in the first asset spot is broadcast 48 to a second network platform. This broadcasting may include broadcasting the content stream free of the first cue type. A second network platform may identify 50 a second cue type in the content stream select a second asset from a second set of assets (e.g., local assets) for insertion 52 into the content stream. At such time, the content stream including the first asset of a first asset type and the second asset of a second asset type may be broadcast 54 to network users.

Figure 8A:
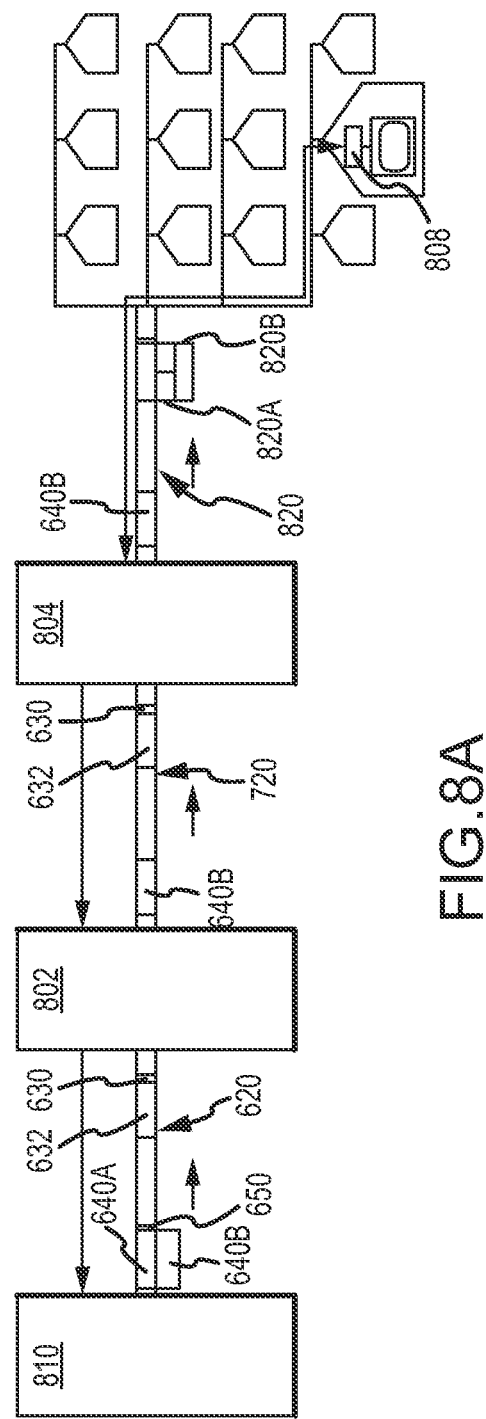
FIG. 8A illustrates multi-level insertion of assets based on signal received from network users.

FIG. 8A illustrates further implementations of the insertion system where communications between a local network platform 804 and a CPE 808 are utilized to select national and/or local assets. As discussed above, in order to provide nationally targeted assets to users of a television network, signals received from at least a portion of the network users (e.g., from CPEs of the network users) may be utilized to select asset options for delivery and/or to determine the size and composition of the viewing audience. For example, a network platform may receive signals from all or a sampling of network users. This sampling is preferably both statistically significant (in terms of sampling size) and valid in terms of being sufficiently random to be reliably representative of the universe of all relevant users. In some cases, the network platform may receive signals only from users who have "opted in" or agreed to participate in the targeted asset system, and this group of users may not be statistically significant or relevant. In many cases, however, these signals may indicate channels currently being viewed and/or the audience classification of current users. In this regard, a two-way communication path between a network platform such as a local headend and CPEs, such as DSTBs, of one or more households may be provided over a network interface.

In the implementation of FIG. 8A, the network platform may include various combinations of the components discussed above in relation to FIGS. 1-7B. In any case, the local network platform 804 includes a headend that is operative to communicate with CPE 808 over a network interface. As shown, the CPE 808 includes a digital set top box (DSTB). As will be appreciated, each user in the network may have such a DSTB or a sub-set (less than all) of the viewers may have such DSTBs. Some users may have a DSTB but only use it some of the time, e.g., only when watching HDTV programming. Moreover, some users may have a DSTB but choose not to participate in the targeted asset system. In any event, at least a portion of the network viewers have a CPE 808 that is operative to receive signals via the network interface as well as provide signals to the network platform 804 via the network interface for purposes of the targeted asset delivery system.

The local network platform 804 may be in communication with a regional network platform 802 (e.g., regional/super headend). In this regard, the regional network platform 802 may receive content from multiple content providers 810 (only one shown) and provide such content (e.g., multiple television channels) to one or more local headends for subsequent dissemination to network users. Of note, the local headends may insert local assets into one or more local asset insertion spots in one or more of the channels received from the regional network platform 802.

In the present implementation, signals received from a CPE 808 are utilized by the present system for at least two separate applications, which in some instances may also be combined. These applications may be termed national asset selection and local asset selection. In this regard, signals from individual CPEs may be utilized for measuring current network conditions. Such measurement relates to the use of the signals to identify the audience size and, optionally, the classification composition of the audience. This information assists in estimating the universe of users available for targeting, including an estimate of the size and composition of an audience for individual channels. In any case, national and/or local assets may be selected and inserted into one or more transmitted data streams based on signals received from one or more CPEs 808.

With regard to audience measurement, the two-way communication between the local network platform 804 and CPE 808 allows for gathering information which may indicate, at least implicitly, information regarding audience size and audience classification composition. In this regard, individual CPEs 808 may periodically or upon request provide a signal to the platform 804 indicating, for example, that an individual CPE 808 is active and what channel is currently being displayed by the CPE 808. This information can be used to infer audience size and composition. Wholly apart from the targeted asset system, such information may be useful to support ratings and share information or for any other audience measurement objective. Such information may also be utilized to tailor transmissions to the CPE 808 or network users.

As illustrated in FIG. 8A, information from one or more CPEs 808 is received by the local network platform 804. The local network platform may then provide this information to the regional network platform 802. Further, the regional network platform may be operative to receive such information from a plurality of local network platforms (not shown). In turn, the regional network platform may provide the information received from the local network platform(s) to one or more affiliates and/or content providers 810. The ability to receive signals indicative of the size and composition of an audience for individual channels allows for using that information to dynamically select national and/or local assets based on current network conditions.

In this regard, the content provider 810 may receive signals from one or more network platforms utilize such signals to select national assets 640A, 640B for insertion into content stream 620 that may be provided to one or more affiliates and/or regional head ends. Likewise, regional head ends 804 may utilize signals to select between national asset options provided with the content stream 620 based on current audience composition and/or size. Alternatively, the regional head end may replace the asset option(s) provided in the content stream 620 with a stored national asset option. That is, while the content provider 810 may provide one or more assets based on overall network conditions, individual regions may select other national level assets when, for example, local head ends indicate a current audience composition is better suited for a national asset that is stored by the regional head end 804.

In any case, the regional head end outputs a content stream 720 that includes a national asset option. For example, asset 640B that is interleaved with programming. Further, the content stream 720 may include one or more local insertion cues 630 and corresponding local asset insertion spots 632. Accordingly, local network platforms 802 may receive the content stream 720 insert one or more local assets into the local asset delivery spot(s) 632, thereby generating a content stream 820 for receipt by network users. In this regard, current network audience information may be utilized at various levels within the broadcast network to dynamically select targeted asset options for network users. Further, referring briefly to FIG. 1, it will be noted that use of signals from network users in one portion of the network may allow for content providers to provide targeted content to other portions of the network. For instance, a content provider may provide content to repeater stations 92 or satellite television providers where two-way communication between the network platforms and the network users is not available. In this regard, by utilizing information from portions of the 'wired network' that supports two-way communication, the content provider may select assets that may be more of interest to the users of the over the air and satellite networks. That is, it may be assumed that users of the wired network provide statistically relevant sampling of the overall network users and selection of assets based on this portion of the network users may be appropriate for other portions of network.

Figure 8B:
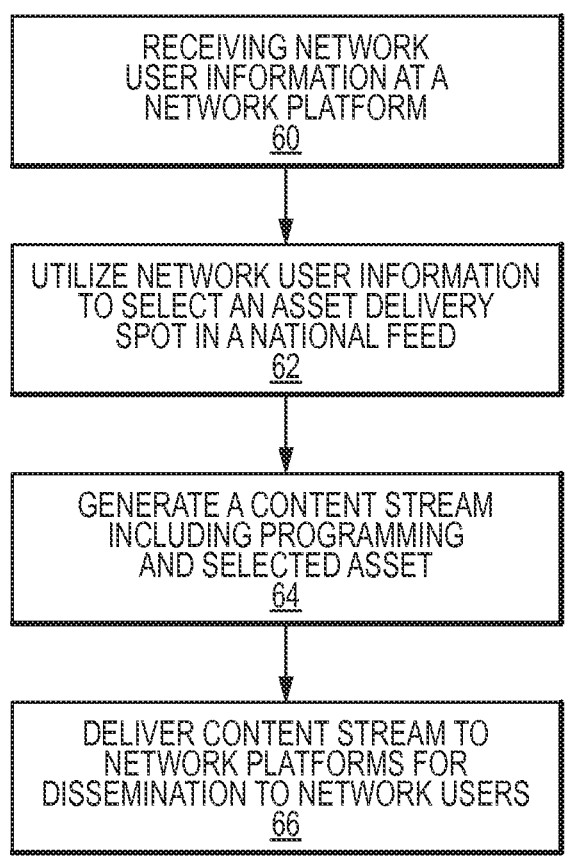
FIG. 8B illustrates one protocol that may be utilized with the system of FIG. 8A.

FIG. 8B illustrates protocol that may be utilized in conjunction with the system illustrated in FIG. 8A. Generally, the protocol includes receiving 60 network user information at a network platform. This network user information may be received directly from network users or via an intervening network platform. In any case, the network user information may be utilized to select 62 at least a first asset for at least a first asset delivery spot. Accordingly, upon selecting the asset, a content stream may be generating 64 including programming and the selected asset. Once the content stream is generated 64, the content stream including programming and the inserted asset may be delivered 66 to a plurality of network platforms. Accordingly, these network platforms may then disseminate the content stream including the programming and asset(s) to a plurality of network regions.

In a further arrangement illustrated in FIG. 8A, the local network platform 802 to may be operative to insert a plurality of different asset options in a plurality of parallel transmission bands 820A, 820B (e.g., asset channels). In this regard, extra bandwidth may be utilized to provide one or more asset option channels that may be selected by a CPE 808 of individual households of network users. Such a system for generating and providing parallel transmission bands including a variety of different targeted assets for selection by CPE devices is provided in U.S. patent application Ser. No. 11/332, 771, as previously incorporated.

The generation and transmission of parallel transmission bands carrying different asset options is substantially similar for transmissions between a content provider and a network platform as well as between a network platform and plurality of network users. In this regard, different assets may be provided on parallel transmission bands (e.g., parallel asset channels) during the break/asset delivery spot in programming. During a break where parallel transmission bands including different assets are available, a network provider or a CPE of a particular household may, based on a determination implemented at the network platform or CPE, respectively, switch to one of the transmission bands that contains appropriate assets. The appropriateness of such assets may be determined based on geographic or demographic information associated with the network platform or CPE. In the case of CPE's, the appropriateness of such assets may be determined based on one or more profiles stored at the CPE. In any case, the asset or assets of the selected transmission band may be displayed during the break.

Figure 9:
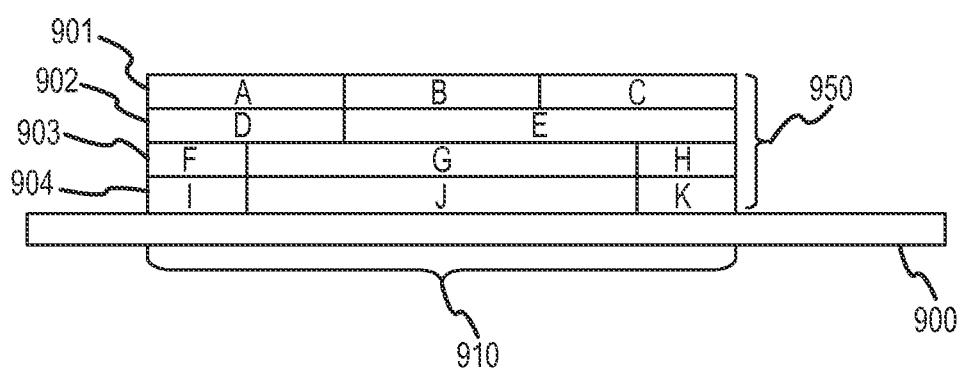
FIG. 9 illustrates a flotilla of assets that may be provided during national asset insertion break and/or a local asset insertion break

The number of asset channels available for targeted asset delivery may be limited by available bandwidth (e.g., unused channels). FIG. 9 illustrates the use of four parallel transmission bands 901-904 for providing assets during a break 910 in programming of a content stream 900. As shown, on each transmission band 901-904, the break 910 may be separated into one or more asset slots that may have different durations. However, in the case of FIG. 9, the start and end times of the asset sets A-C, D-E, F-H and I-K carried by the transmission bands 901-904 are aligned with the start and end times of the break 910. Each of the transmission bands 901-904 may carry an asset that is targeted to a specific geographic and or demographic characteristics of network users.

Each transmission band 901-904 includes a different combination of assets A-K that may be targeted to different network users who received the content stream 900. Collectively, the assets A-K carried by the transmission bands 904 define a flotilla 950 that includes assets that may be targeted to different groups of users. The most appropriate assets for a given user or group of users may be on different ones of the transmission bands 901-904 at different times during the break 910. However, most appropriate assets may still be delivered to the users or groups of users by hopping between transmission bands during the break with due consideration given to the fact that spots on different transmission bands 901-904 may not have the same start and end times. As noted above, selection of assets to fill a break of a programming channel, or to fill the available spots within each transmission band may be performed dynamically based feedback received from current network users. However, it will be further appreciated that selection of assets may be scheduled ahead of time where an assets on different transmission bands are provided for different demographic groups that are assumed to be members of the network users to receive the programming.

The ability to provide different cue types for use at different levels within the broadcast network also provides several marketing opportunities. For instance, in the instance where a national level cue is provided that allows for a first level network platform, such as an affiliate, to replace or select an asset for the national level insertion opportunity, the cue may be offered for sale to one or more downstream platforms. For instance, if an affiliate receives a national feed having a national cue, the affiliate may offer the rights to this cue to downstream network platforms. For instance, the affiliate may sell the rights to the cue to one or more operators (e.g., MSOs) and deliver a content stream to those MSOs that still includes the national level cue. This allows the MSOs to insert assets in the insertion spot associated with the cue or provide this cue to further downstream platforms such as local head ends, which may each pay the MSO for the right to the cue/insertion spot.

In this application, a national level asset provider may be denied the opportunity to provide assets to a portion of the network. However, in such an arrangement, the local head ends, regional head ends and/or affiliates may have made a determination that it is economically more desirable to provide local insertion opportunities than a national level asset. Accordingly, the rights to perform such substitution of the national level asset may be paid to the content provider and/or the original national level asset provider. In this regard, the national level asset provider may be partially subsidized for their rights to the asset insertion opportunity within the programming content. While the national level asset provider may lose the opportunity to advertise to one or more portions of the network, the subsidy provided by the substitution of national level assets the network platforms may reduce the overall advertising costs of such a national level asset provider. For instance, if half of the affiliates receiving a national feed (e.g., representing half of an expected audience) paid for the right to replace a national level asset with regional or local assets, the national level asset provider whose asset is substituted may be subsidized by an amount that is more half of the price paid for the national level asset spot. In this regard, the national level asset provider may reach a significant audience at a reduced price per viewer.

When a first level network platform determines it is economically viable to purchase the rights to such a national level insertion spot, this platform may provide access to downstream platforms in a number of ways. For instance, the affiliate may provide encryption information to downstream platforms that purchase the rights to the cue. Alternatively, where the content stream includes a restricted cue associated with the national level insertion spot and unrestricted cues that are associated with existing local insertion spots, the platform may modify the content stream to replace the restricted cue with an unrestricted cue. For instance, a platform having decryption information may erase the restricted cue from the content stream and insert a non-encrypted cue that is available to downstream platforms.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

The invention claimed is:

1. A method for use in connection with delivering assets to users of a broadcast network, said broadcast network primarily involving synchronized distribution of broadcast content to multiple users, said method comprising:

generating a content stream including programming segments and at least a first asset delivery spot and first cue for use by first level delivery systems of the broadcast network, wherein said first level delivery systems comprise network platforms for broadcast of delivery of content to user equipment devices within one or more subdivisions of said broadcast network, said first level delivery systems being controlled by one or more first stakeholders authorized to control one or more first assets that are inserted in said first asset delivery spot so as to provide a modified content including said one or more first assets, and at least a second asset delivery spot and second cue for use with second level delivery systems, wherein said second level delivery systems are operative for delivery of content to user equipment devices both within and outside of said one or more subdivisions at said broadcast network, said second level delivery systems being controlled by one or more second stakeholders, different than said first stakeholders who are authorized to control one or more second assets that are delivered in said second asset delivery spot;

providing a mechanism for securing access to at least one of said first cue and said second cue such that said first stakeholders control delivery with respect to said first asset delivery spot and said second stakeholder controls delivery with respect to said second asset delivery spot;

providing an authorization to at least one of said first and second stakeholders, in connection with acquiring rights to insert one or more assets in at least one of said first and second asset delivery spots, said authorization allowing use of at least one of said first and second cues;

transmitting said content stream in said broadcast network such that said first level delivery systems can control asset delivery for said first asset delivery spot and said second level delivery systems can control asset delivery for said second asset delivery spot;

second providing at least two asset options for said first asset delivery spot of said content stream, wherein at least a portion of said first level delivery systems is operative to:
  a) identify said first cue for use with said first level delivery systems; and
  b) in response to said first cue, provide at least one of said first assets for delivery in said first asset delivery spot; and providing at least two asset options for said second asset delivery spot of said content stream, wherein at least one of said second level delivery systems is operative to:
  a) identify said second cue for use with said second level delivery systems;
  b) select one of said second assets based on information specific to a particular subscriber of said broadcast network; and
  c) deliver said selected one of said second assets to said particular subscriber of said broadcast network.

2. The method of claim 1, wherein said first level delivery systems are further operative to erase said first cue, wherein said modified content stream is disseminated free of said first cue.

3. The method of claim 1, wherein said step of second providing comprises providing said asset options in synchrony with said content stream.

4. The method of claim 3, wherein at least one of said asset options is provided in a parallel transmission band to said content stream.

5. The method of claim 4, wherein said step of second providing comprises:
  forwarding said asset options to said first level delivery systems prior to said delivery of said content stream to said first level delivery systems.

6. The method of claim 4, encrypting said first cue prior to delivery to the first level delivery systems.

7. The method of claim 4, wherein at least a portion of said second level delivery systems is operative to insert content into said second asset insertion spot in said content stream.

8. The method of claim 4, further comprising:
  receiving network user information from at least one of said first or second level delivery systems; and
  using said network user information to select said asset options.

9. A method of claim 4, further comprising receiving, at a platform of said broadcast network, report information reporting delivery of at least one of said first and second assets.

10. An apparatus for use in connection with delivering assets to users of a broadcast network, said broadcast network primarily involving synchronized distribution of broadcast content to multiple users, comprising:
  first level delivery systems, of the broadcast network, for receiving a content stream including programming segments and at least a first asset delivery spot and first cue, wherein said first level delivery systems comprise network platforms for broadcast delivery of content to user equipment devices within one or more subdivisions of said broadcast network, said first level delivery systems being controlled by one or more first stakeholders authorized to control one or more first assets that are inserted in said first asset delivery spot so as to provide a modified content including said one or more first assets;
  second level delivery systems for receiving at least a second asset delivery spot and second cue, wherein said second level delivery systems are operative for delivery of content to user equipment devices both within and outside of said one or more subdivisions at said broadcast network, said second level delivery systems being controlled by one or more second stakeholders, different than said first stakeholders, who are authorized to control one or more second assets that are delivered in said second asset delivery spot; and
  one or more processors operative for:
  providing a mechanism for securing access to at least one of said first cue and said second cue such that said first stakeholders control delivery with respect to said first asset delivery spot and said second stakeholder controls delivery with respect to said second asset delivery spot;
  providing an authorization to at least one of said first and second stakeholders, in connection with acquiring rights to insert one or more assets in at least one of said first and second asset delivery spots, said authorization allowing use of at least one of said first and second cues;
  transmitting said content stream in said broadcast network such that said first level delivery systems can control asset delivery for said first asset delivery spot and said second level delivery systems can control asset delivery for said second asset delivery spot;
  second providing at least two asset options for said first asset delivery spot of said content stream; and
  providing at least two asset options for said second asset delivery spot of said content stream; and
  wherein at least a portion of said first level delivery systems is operative to:
  a) identify said first cue for use with said first level delivery systems; and
  b) in response to said first cue, provide at least one of said first assets for delivery in said first asset delivery spot; and
  wherein at least one of said second level delivery systems is operative to:

a) identify said second cue for use with said second level delivery systems;
b) select one of said second assets based on information specific to a particular subscriber of said broadcast network; and
c) deliver said selected one of said second assets to said particular subscriber of said broadcast network.

11. An apparatus as set forth in claim 10, wherein said first level delivery systems are further operative to erase said first cue, wherein said modified content stream is disseminated free of said first cue.

12. An apparatus as set forth in claim 10, wherein said second providing comprises providing said asset options in synchrony with said content stream.

13. An apparatus as set forth in claim 12, wherein at least one of said asset options is provided in a parallel transmission band to said content stream.

14. An apparatus as set forth in claim 10, wherein said second providing comprises:
forwarding said asset options to said first level delivery systems prior to said delivery of said content stream to said first level delivery systems.

15. An apparatus as set forth in claim 10, wherein said one or more processors are operative for encrypting said first cue prior to delivery to the first level delivery systems.

16. An apparatus as set forth in claim 10, wherein at least a portion of said second level delivery systems is operative to insert content into said second asset insertion spot in said content stream.

17. An apparatus as set forth in claim 10, wherein said one or more processors are further operative for:
receiving network user information from at least one of said first or second level delivery systems; and
using said network user information to select said asset options.

18. An apparatus as set forth in claim 10, wherein said one or more processors are further operative for receiving, at a platform of said broadcast network, report information reporting delivery of at least one of said first and second assets.

* * * * *